US011064706B2

(12) United States Patent
Krepinsky et al.

(10) Patent No.: US 11,064,706 B2
(45) Date of Patent: Jul. 20, 2021

(54) APPARATUS AND METHOD FOR VENTRAL/DORSAL ALIGNMENT OF FISH

(71) Applicant: NORDISCHER MASCHINENBAU RUD. BAADER GMBH + CO. KG, Lübeck (DE)

(72) Inventors: Gunnar Krepinsky, Lübeck (DE); Jörg Holtz, Lübeck (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 16/657,362

(22) Filed: Oct. 18, 2019

(65) Prior Publication Data

US 2020/0120944 A1 Apr. 23, 2020

(30) Foreign Application Priority Data

Oct. 19, 2018 (EP) .................................... 18201515

(51) Int. Cl.
*A22C 25/00* (2006.01)
*A22C 25/12* (2006.01)
*A22C 25/08* (2006.01)

(52) U.S. Cl.
CPC ............. *A22C 25/12* (2013.01); *A22C 25/08* (2013.01)

(58) Field of Classification Search
CPC ......... A22C 25/00; A22C 25/04; A22C 25/08; A22C 25/12

(Continued)

(56) References Cited

U.S. PATENT DOCUMENTS 3,550,192 A * 12/1970 Ericksson .............. A22C 25/12
452/179
4,270,650 A 6/1981 Krohn
(Continued)

FOREIGN PATENT DOCUMENTS

DE 1 654 871 5/1971
DE 2 102 590 7/1971
(Continued)

OTHER PUBLICATIONS

European Search Report issued in EP 18201515.6.
Russian Search Report and Office Action (with English translation) issued in RU 2019133143 dated Apr. 21, 2020.

Primary Examiner — Richard T Price, Jr.
(74) Attorney, Agent, or Firm — Greenblum & Bernstein, P.L.C.

(57) ABSTRACT

Method and apparatus for ventral/dorsal alignment of fish. The apparatus includes a first fish conveying device, a guide roller configured for transversely positioning the fish in a feed-in channel, the guide roller extending across the width of the feed-in channel and having at least one section with reduced cross-sectional diameter, a channel floor in the center of the channel comprising a transfer recess, widening in the conveying direction, which is designed to transfer the fish by the effect of gravity to a guiding channel arranged below the first conveying plane by aligning in a predetermined ventral/dorsal position. The guiding channel includes lateral guide surfaces each arranged inclined with respect to the first conveying plane. A second conveying device, forming a second conveying plane and configured to convey the fish on their side, is provided. The second conveying device is arranged downstream of the guiding channel for taking over the fish at the end of said guiding channel.

21 Claims, 40 Drawing Sheets

(58) Field of Classification Search
USPC .................................. 452/177, 179, 182, 184
See application file for complete search history.

(56) References Cited

U.S. PATENT DOCUMENTS

| | | | |
|---|---|---|---|
| 4,570,784 A | | 2/1986 | Wenzel |
| 5,026,319 A | | 6/1991 | Miyazaki |
| 5,033,164 A | | 6/1991 | Miyazaki |
| 5,115,903 A | * | 5/1992 | Leander .................. A22C 25/12 |
| | | | 198/400 |
| 2006/0194531 A1 | * | 8/2006 | King ...................... A01K 61/95 |
| | | | 452/62 |
| 2009/0156109 A1 | * | 6/2009 | Goodrick ............... A22B 3/083 |
| | | | 452/57 |
| 2014/0378038 A1 | * | 12/2014 | Baeza Rischter ........ A22B 3/08 |
| | | | 452/54 |
| 2018/0160692 A1 | | 6/2018 | Paulsohn |

FOREIGN PATENT DOCUMENTS

| | | |
|---|---|---|
| EP | 0 384 956 | 9/1990 |
| EP | 2 982 448 | 2/2016 |
| JP | 53-138898 | 12/1978 |
| SU | 1124909 | 11/1984 |

* cited by examiner

APPARATUS AND METHOD FOR VENTRAL/DORSAL ALIGNMENT OF FISH

CROSS-REFERENCE TO RELATED APPLICATIONS

The present application claims priority under 35 U.S.C. § 119(a) of Europe Patent Application No. 18 20 1515.6-1011 filed Oct. 19, 2018, the disclosure of which is expressly incorporated by reference herein in its entirety.

BACKGROUND) OF THE INVENTION

1. Field of the Invention

The present invention relates to an apparatus for ventral/dorsal alignment of fish. The invention additionally relates to a method for ventral/dorsal alignment of fish.

2. Discussion of Background Information

Such apparatuses and methods are used in the automatic processing of fish. For the further processing steps during fish processing, it is necessary to align the fish uniformly with respect to their ventral/dorsal position. Due to their body geometry, the fish generally lie on their side but are not sorted with respect to the ventral and dorsal side. To be able to process the fish at downstream processing stations, it is necessary that they are uniformly aligned in a predetermined orientation with respect to their ventral/dorsal position.

A large number of different solutions for aligning the ventral/dorsal position are known from the prior art. Some solutions are based on the use of optical sensor technology combined with pneumatic actuator technology to first determine the position of the fish and, provided that the fish are not already in the correct position with respect to the ventral/dorsal alignment, to turn over these fish that are located in the incorrect position by the controlled intervention of pneumatic actuators and to bring them into the desired ventral/dorsal alignment. Such alignment systems are usually complex and cost-intensive. Soiling of the optical sensors frequently leads to malfunctions and/or makes increased cleaning necessary.

Other known apparatuses and methods rely on a purely mechanical solution. For example, published document DE 2102590 discloses a method and an apparatus for mechanically aligning fish in the ventral/dorsal position. An elastic roller acts on the fish which roller, due to its cross-sectional shape, presses asymmetrically on each fish and thus creates a force component on the fish which displaces them in the direction of the dorsal side of the fish.

One disadvantage of such purely mechanical aligners is that, on the one hand, the fish are subjected to high mechanical loads and, on the other hand, the aligners are not very reliable with regard to correct ventral/dorsal alignment, particularly when processing low quality fish.

SUMMARY

It is therefore the object of the present invention to propose an apparatus that is as robust as possible which guarantees the alignment of fish in the required ventral/dorsal position with a high degree of reliability. The object is also to propose an apparatus which brings about alignment of the fish by purely mechanical means. The object is also to propose a corresponding method.

The object is achieved by an apparatus with the features referred to hereinbefore, said apparatus comprising: a first conveying device configured for conveying of fish head-first on their side with a feed-in channel configured for guiding the fish in the conveying direction, said feed-in channel having a channel floor forming a first conveying plane; at least one guide roller arranged at a distance from the channel floor and configured for transversely positioning the fish in the feed-in channel, said guide roller extending across the width of the feed-in channel and having at least one section with reduced cross-sectional diameter, the channel floor in the centre of the channel comprising a transfer recess, widening in the conveying direction, which is designed to transfer the fish by the effect of gravity to a guiding channel arranged below the first conveying plane by aligning in a predetermined ventral/dorsal position, the guiding channel comprising lateral guide surfaces each arranged inclined with respect to the first conveying plane; and further, a second conveying device, forming a second conveying plane and configured to convey the fish on their sides, said second conveying device being arranged downstream of the guiding channel for taking over the fish at the end of said guiding channel.

The apparatus according to the invention has the advantage that the fish are aligned with a high degree of reliability regarding the desired ventral/dorsal position without the need for any complicated sensor technology or actuator technology. The apparatus according to the invention completely does without any such electrical components, consisting exclusively of mechanical components which also makes the apparatus according to the invention extremely robust. Due to cooperation of the guide roller with the at least one section with reduced cross-sectional diameter, the transfer recess and the guiding channel, automatic alignment of the fish with respect to their ventral/dorsal position takes place because of the typical cross-sectional geometry of the fish body. Due to the guide roller with at least one section with reduced cross-sectional diameter, the fish are aligned transverse to the conveying direction in the feed-in channel under the effect of minimum guiding forces and are subsequently transferred into the guiding channel via the transfer recess such that these guiding forces do not cause any damage or deformation to the fish bodies.

A further expedient embodiment of the invention is characterised in that the section with reduced cross-sectional diameter of the guide roller is arranged eccentrically with respect to the centre of the feed-in channel. The interaction of this eccentrically arranged guide roller with the cross-sectional geometry of the fish results in the fish taking up different positions in the feed-in channel transverse to the conveying direction, depending on whether the respective fish is already pointing with its ventral side to the left or to the right in relation to the conveying direction.

According to a further preferred embodiment, the cross-sectional diameter of the guide roller, starting from the section with reduced cross-sectional diameter, is configured in each case to increase towards the outer sections of the guide roller. Advantageously, the fish are always aligned towards the centre of the feed-in channel by the guide roller profile as they continue to pass through the feed-in channel. However, the exact position of the fish transverse to the conveying direction is—as previously described—dependent on the alignment of the fish on entering the feed-in channel.

A further expedient embodiment of the invention is characterised in that the section with reduced cross-sectional diameter together with the outer sections forms a concave outer contour of the guide roller. The concave outer contour forms, at least substantially, the counterpart to the cross-sectional geometry of the fish. This ensures that the fish are transversely positioned in the feed-in channel with a high degree of reliability, depending on their position. In the region of the outer sections, the guide roller is preferably shaped at least substantially as a truncated cone in each case. Consequently, the guide roller preferably has a double truncated cone structure.

A preferred development of the invention is characterised in that the outer contour is configured step-free. This ensures that the contact established between the guide roller and the fish is as flat as possible so that the guide forces acting on the fish operate in the manner of a surface load and no large point or knife-edged loads are exerted on it. In this way, the fish is aligned particularly gently in the feed-in channel transverse to the conveying direction.

A further expedient embodiment of the invention is characterised in that the guide roller is arranged so as to be yieldingly mounted. This has the advantage that the guide roller automatically yields as fish of varying size pass through, such that the forces acting on the fish do not exceed a predefinable maximum force. The guide roller preferably yields against gravity. In this way, the pressing force that can be generated by the guide roller may be predetermined by the dead weight of said guide roller. The guide roller is optionally yieldingly mounted on a pivot arm. In this case, the magnitude of the pressing force may be adjusted by the length of the pivot arm, the dead weight of the guide roller, additional weights arranged on the pivot arm and/or by spring pre-tensioning.

According to a further preferred embodiment of the invention, at least one of the guide rollers is arranged upstream of the transfer recess in the conveying direction. In this way, the fish in the feed-in channel are pre-aligned with respect to their position transverse to the conveying direction and are advanced to the transfer recess in different transverse positions corresponding to their original ventral/dorsal position.

According to another preferred embodiment of the invention, at least one of the guide rollers is arranged in an entry region of the transfer recess, within which entry region the width of the transfer recess is smaller than the end width of the transfer recess. In this way, even as the fish enter the entry region of the transfer recess, adequate guidance of the fish with respect to their transverse position in the feed-in channel is guaranteed. This has an advantageous effect on the reliability of the apparatus according to the invention, such that the proportion of fish which reach the guiding channel with an incorrect ventral/dorsal alignment that does not correspond to the predetermined ventral/dorsal position is reduced to a minimum.

According to a further preferred embodiment of the invention, the inclinations of the lateral guide surfaces of the guiding channel are different in each case. The different inclinations of the lateral guide surfaces of the guiding channel support the selection effect, namely whether a fish passing through the transfer recess is to be turned over with respect to its ventral/dorsal position or whether it retains its existing alignment. A preferred development of the invention is characterised in that the guiding channel is at least substantially triangular in cross-section.

A further expedient embodiment of the invention is characterised in that the lateral guide surfaces of the guiding channel are arranged inclined, in such a manner that they form a guiding channel floor which is aligned at least substantially flush with section of the guide roller with reduced cross-sectional diameter. This further improves the previously described selection effect of the present invention. Due to the said positional relationship of the guiding channel floor to the section of the guide roller with reduced cross-sectional diameter, it is achieved that fish which did not pass through the feed-in channel in the desired predetermined ventral/dorsal alignment, are transferred, on reaching the transfer recess with their dorsal side directed downwards, via the transfer recess into the guiding channel and, guided therein, are supported by the lateral guide surfaces of the guiding channel in such a manner that the fish change their alignment with respect to the ventral/dorsal position.

A further expedient embodiment of the invention is characterised in that deflector elements are arranged laterally in each case in the feed-in channel, said deflector elements extending in each case, starting from the side walls of the feed-in channel, in the direction of the transfer recess.

According to another preferred embodiment, the channel floor of the feed-in channel is rough and the first conveying device is designed as a vibrating conveyor.

Furthermore, the object is achieved by a corresponding method having the features referred to hereinbefore, in that the method according to the invention comprises the following steps: conveying of fish head-first on their side by means of a first conveying device and feeding in the fish in the conveying direction by means of a feed-in channel, which has a first channel floor forming a first conveying plane, wherein the channel floor in the centre of the channel comprises a transfer recess, widening in the conveying direction; transversely positioning the fish in the feed-in channel by means of at least one guide roller arranged at a distance from the channel floor, said guide roller extending across the width of the feed-in channel and having at least one section with reduced cross-sectional diameter; transferring the fish by the effect of gravity to a guiding channel arranged below the first conveying plane by aligning in a predetermined ventral/dorsal position, wherein the guiding channel comprises lateral guide surfaces each arranged inclined with respect to the first conveying plane; and taking over the fish at the end of the guiding channel by means of a second conveying device forming a second conveying plane and conveying the fish on their side by means of the second conveying device.

A preferred development of the invention is characterised by transversely positioning the fish by means of the guide roller which takes place in that the guide roller has a section with reduced cross-sectional diameter, said guide roller being arranged eccentrically with respect to the centre of the feed-in channel.

According to another preferred embodiment according to the invention, transversely positioning the fish takes place by means of the guide roller depending on the ventral/dorsal position of the fish, the cross-sectional diameter of said guide roller, starting from the section with reduced cross-sectional diameter, increasing towards outer sections of the guide roller.

A further expedient embodiment of the invention is characterised in that transversely positioning by means of the guide roller is brought about by a concave outer contour which the section with reduced cross-sectional diameter forms together with the outer sections.

According to another preferred embodiment of the invention, the guide roller yields against the restoring force during transverse positioning of the fish.

A further expedient embodiment of the invention is characterised in that the fish are first aligned transversely to the conveying direction in the feed-in channel by means of the guide roller and subsequently pass through the transfer recess.

Another expedient embodiment of the invention is characterised by conveying the fish by means of the first conveying device by vibration.

Further preferred and/or expedient features and embodiments of the invention emerge from the dependent claims and the description. Especially preferred embodiments are explained in greater detail with reference to the attached drawing.

BRIEF DESCRIPTION OF DRAWINGS

Groups 1 to 6 of the figures illustrate the construction and mode of operation of the apparatus according to the invention and the method according to the invention, using as an example the passage of a fish which, when entering the apparatus, does not have the desired alignment of the ventral/dorsal position and, when passing through the apparatus, is rotated about its longitudinal axis in such a manner that the desired alignment is achieved on leaving the apparatus. The following explanations are based on the assumption that a ventral/dorsal alignment is desired in which the belly of the fish points to the left in the conveying direction, while the back of the fish points to the right in the conveying direction.

DETAILED DESCRIPTION

Figure 1A:
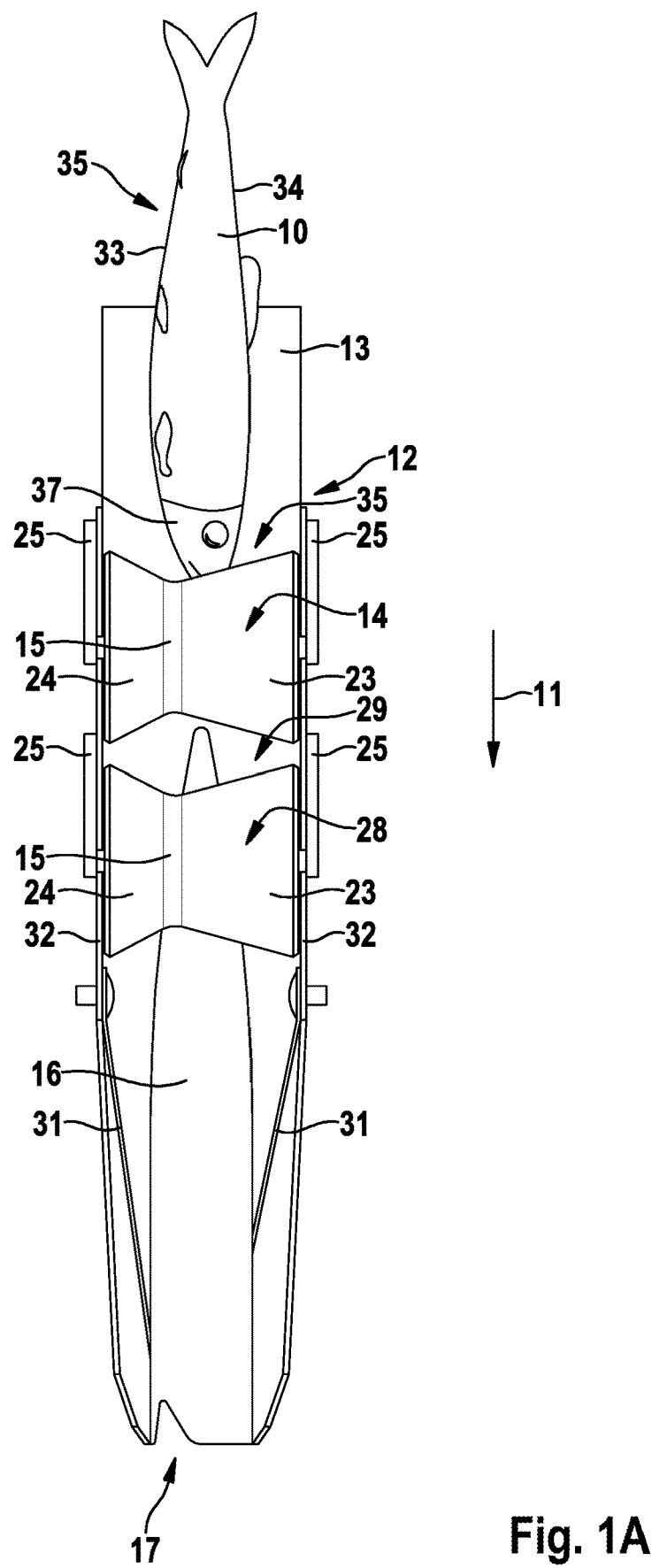
FIG. 1A shows a view from above as the fish, which does not have the desired alignment of the ventral/dorsal position, enters the apparatus according to the invention.

The apparatus according to the invention and the method according to the invention will be described in detail based on the figures.

The apparatus according to the invention is to be described in greater detail below, based initially on FIGS. 1a, 1b and 1c. The apparatus comprises a first conveying device configured for conveying of fish 10 head-first on their side with a feed-in channel 12 configured for guiding the fish 10 in the conveying direction 11, said feed-in channel having a channel floor 13 forming a first conveying plane.

At least one guide roller 14 is arranged above the channel floor 13 at a distance from said channel floor 13. The guide roller 14 is configured for transversely positioning the fish 10 in the feed-in channel 12. The guide roller 14 extends over the width of the feed-in channel 12. The guide roller 14 has at least one section 15 with reduced cross-sectional diameter.

As shown in FIG. 1a, the channel floor 13 in the centre of the channel has a transfer recess 16, widening in the conveying direction 11. This is designed and configured to transfer the fish 10 by the effect of gravity to a guiding channel 17 arranged below the first conveying plane. When the fish 10 are transferred, they are brought into a predetermined ventral/dorsal position. The guiding channel 17 comprises lateral guide surfaces 18, 19 each arranged inclined with respect to the first conveying plane.

Figure 1B:
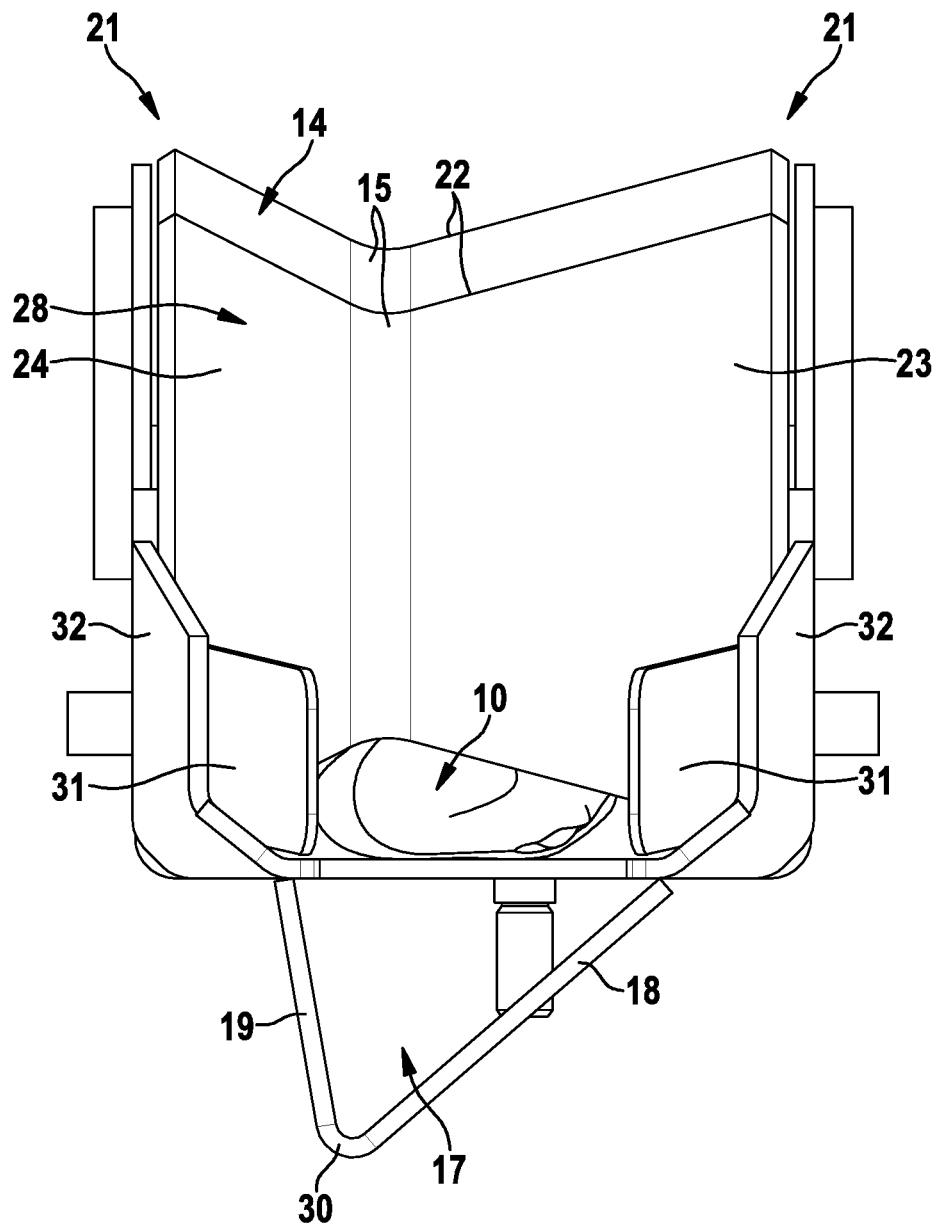
FIG. 1B shows a lateral view viewed counter to the conveying direction.

As shown in FIG. 1b, the section 15 with reduced cross-sectional diameter of the guide roller 14 is arranged eccentrically with respect to the centre of the feed-in channel. In other words, the section 15 is arranged eccentrically with respect to an axis of symmetry of the feed-in channel 12 running in the conveying direction. The axis of symmetry of the feed-in channel 12 does not therefore coincide with the section 15 with reduced cross-sectional diameter.

FIG. 1b shows how the cross-sectional diameter of the guide roller 14, starting from the section 15 with reduced cross-sectional diameter, is configured to increase in each case towards the outer sections 21 of the guide roller 14. In other words, the guide roller 14 in the section 15 has a reduced diameter compared to the outer sections 21. In this way, the section 15 with reduced cross-sectional diameter together with the outer sections 21 forms a concave outer contour 22 of the guide roller 14.

In the region of the outer sections 21, the guide roller 14 is preferably shaped at least substantially as a truncated cone in each case. The guide roller 14 is therefore substantially composed of two truncated cone elements 23, 24. Further preferably, the outer contour 22 is configured step-free.

Figure 1C:
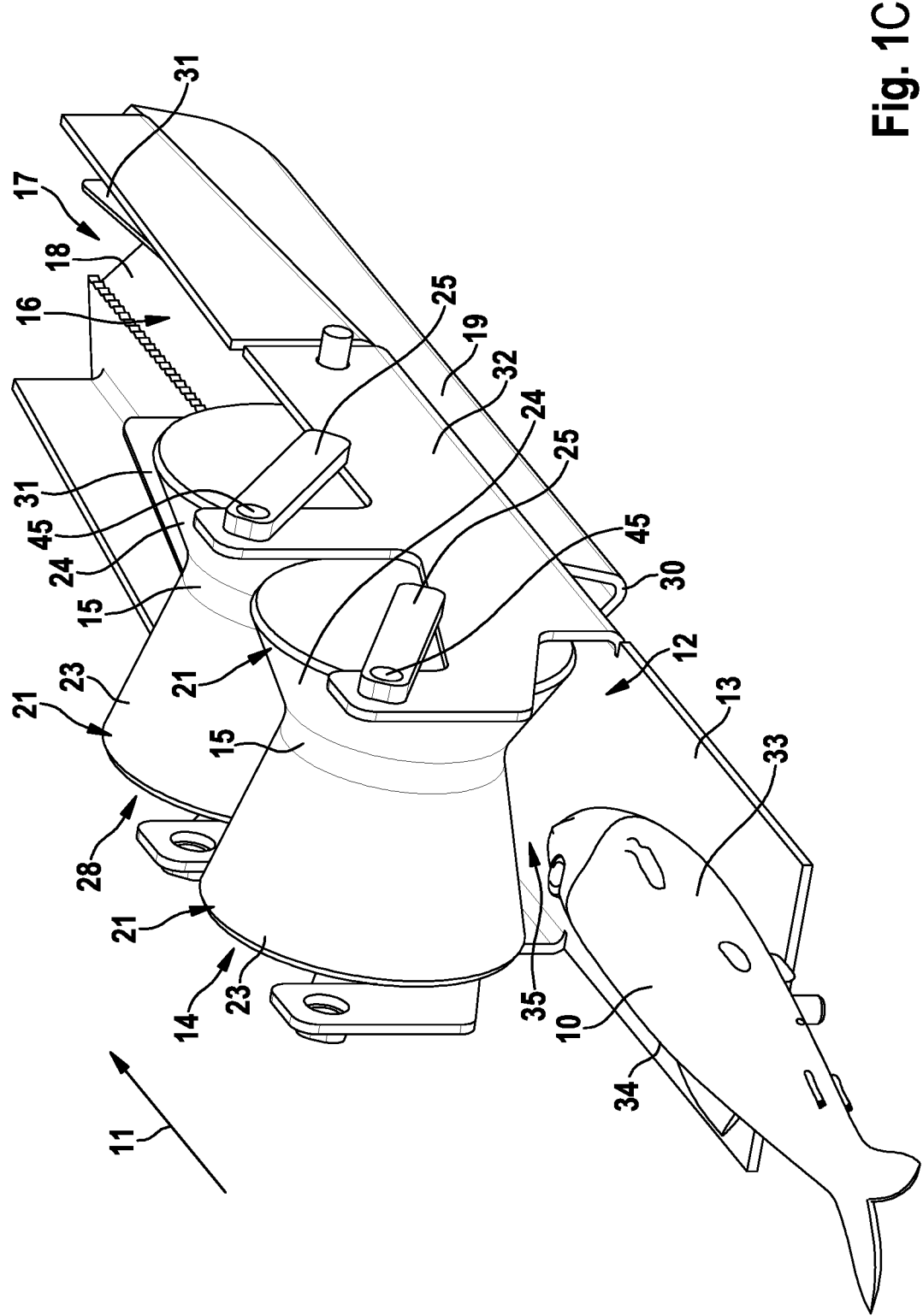
FIG. 1C is a perspective view viewed in the conveying direction.
Figure 16:
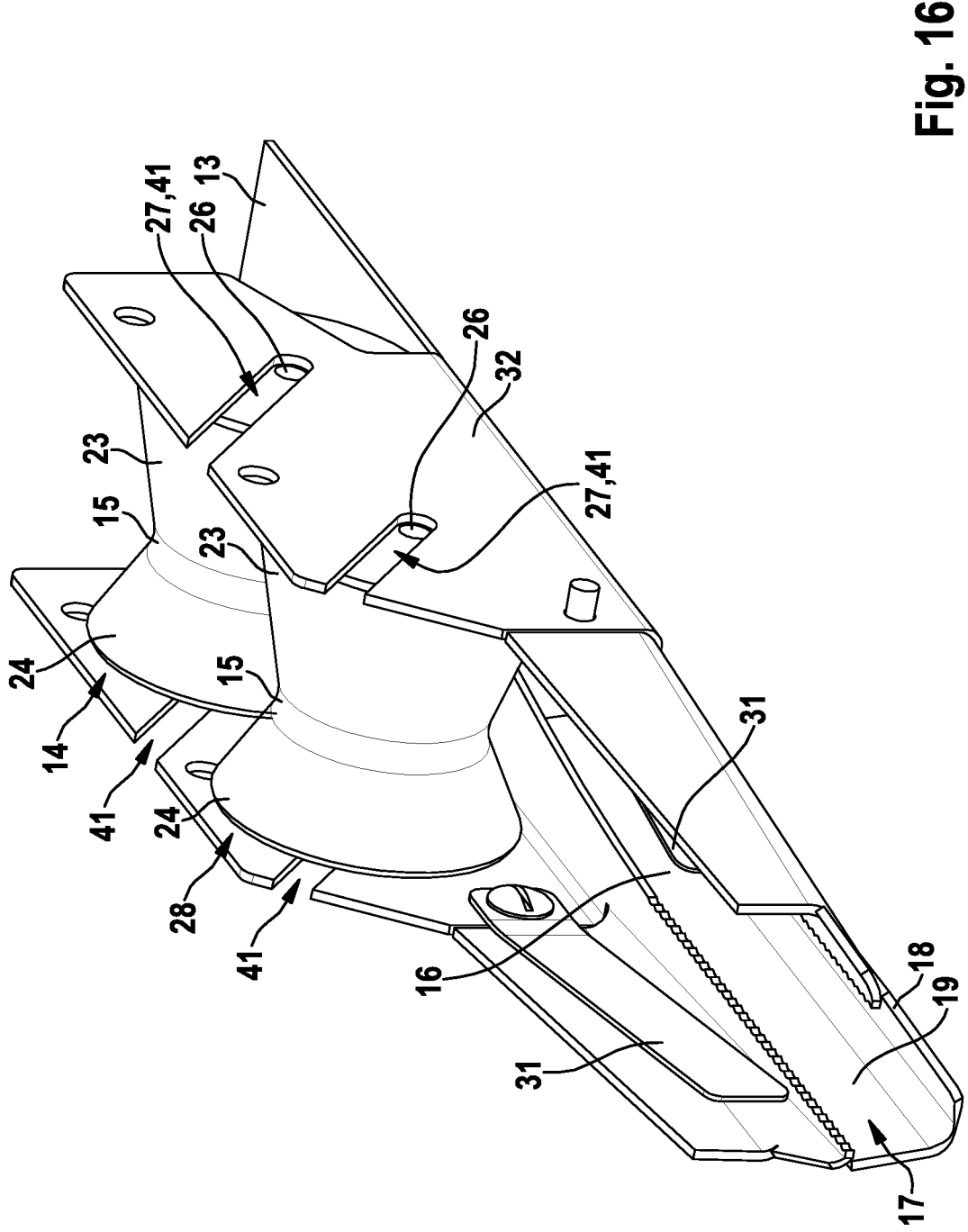
FIG. 16 shows the apparatus shown in FIG. 15 according to an alternative embodiment.

As can be seen from FIG. 1c, the guide roller 14 is arranged so as to be yieldingly mounted. The guide roller 14 is arranged pivotably on both sides by means of lever arms 25. The lever arms 25 pivot about a pivot axis 45. FIG. 16 show an alternative movable arrangement of the guide roller 14. The axis of rotation 26 of the guide roller 14 is mounted in each case in recesses 27 which are configured to run obliquely in conveying direction 11.

The number of guide rollers 14 is not limited to one. As shown in the drawing, preferably a further guide roller 28 is used. The design characteristics of the further guide roller 28 are the same as the characteristics described in connection with the guide roller 14. Preferably, the one of the guide rollers 14 is arranged upstream of the transfer recess 16 in the conveying direction 11. Further preferably, at least one of the guide rollers 14 is arranged in an entry region 29 of the transfer recess 16, within which the width of the transfer recess 16 is smaller than the end width of the transfer recess 16.

FIG. 1b shows that the inclination of the lateral guide surfaces 18, 19 of the guiding channel 17 are preferably different in each case. The guiding channel 17 has a cross-section that is at least substantially triangular. Further preferably, the lateral guide surfaces 18, 19 of the guiding channel 17 are arranged inclined in such a manner that they form a guiding channel floor 30 which is aligned at least substantially flush with section 15 of the guide roller 14 with reduced cross-sectional diameter.

Preferably, deflector elements 31 are arranged laterally in each case in the feed-in channel 12, said deflector elements extending in each case, starting from the side walls 32 of the feed-in channel 12, in the direction of the transfer recess 16.

Advantageously, the channel floor 13 of the feed-in channel 12 is designed to be rough and the first conveying device is designed as a vibrating conveyor. Due to the interaction of the rough surface of the feed-in channel 12 and the vibrating motion of the conveying device in conveying direction 11, the fish 10 are conveyed through the feed-in channel 12 in the conveying direction due to their scale structure.

The mode of operation of the apparatus according to the invention and of the method according to the invention is to be described below, initially based on figure groups 1 to 6 which show the passage of a fish that does not have the desired alignment with respect to its ventral/dorsal position when it enters the feed-in channel 12.

FIGS. 1a, 1b and 1c show that the fish 10—viewed in the conveying direction 11—is aligned with its ventral side 33 towards the right, while the dorsal side 34 of the fish 10 points to the left.

For the sake of a uniform presentation, the alignment of the fish 10 with respect to the ventral/dorsal position is always stated below viewed in conveying direction 11.

Figure 2A:
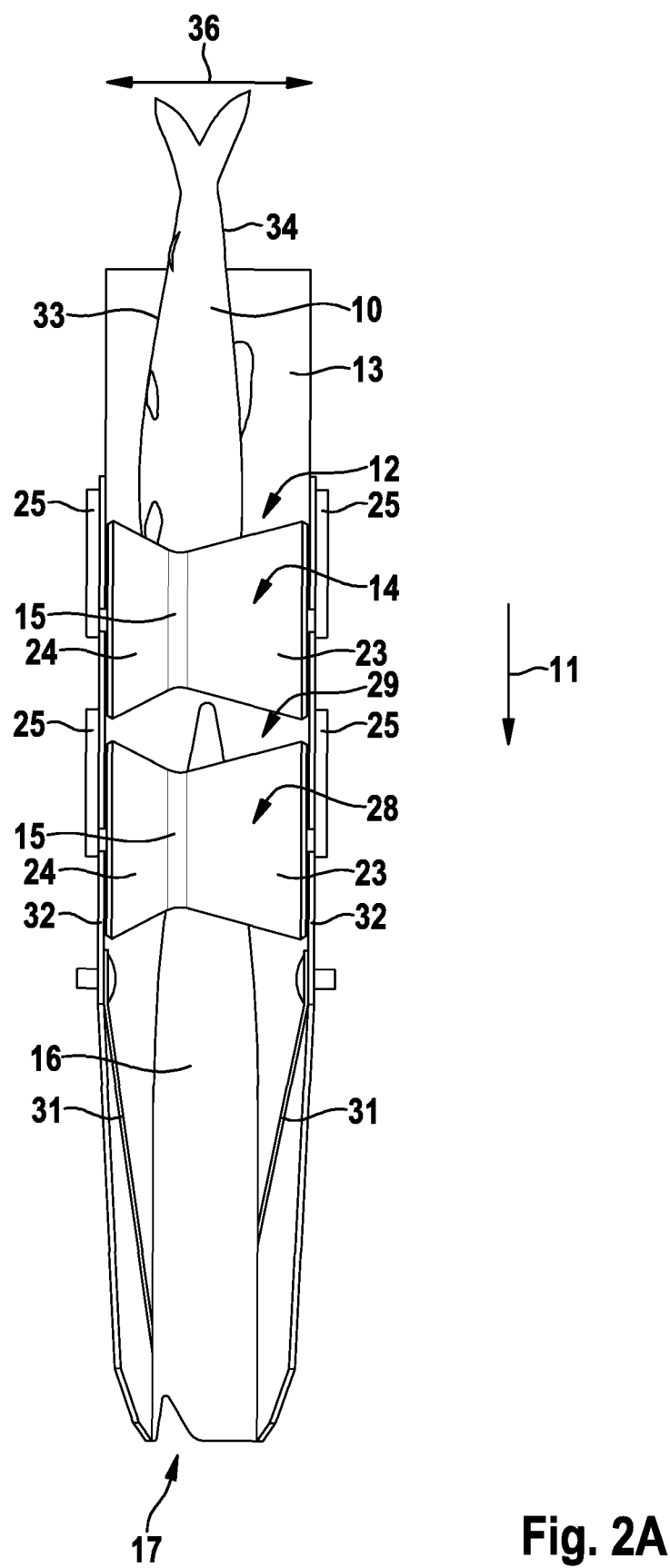
FIG. 2A shows a view from above as the fish further downstream in the apparatus than in FIG. 1A.
Figure 2B:
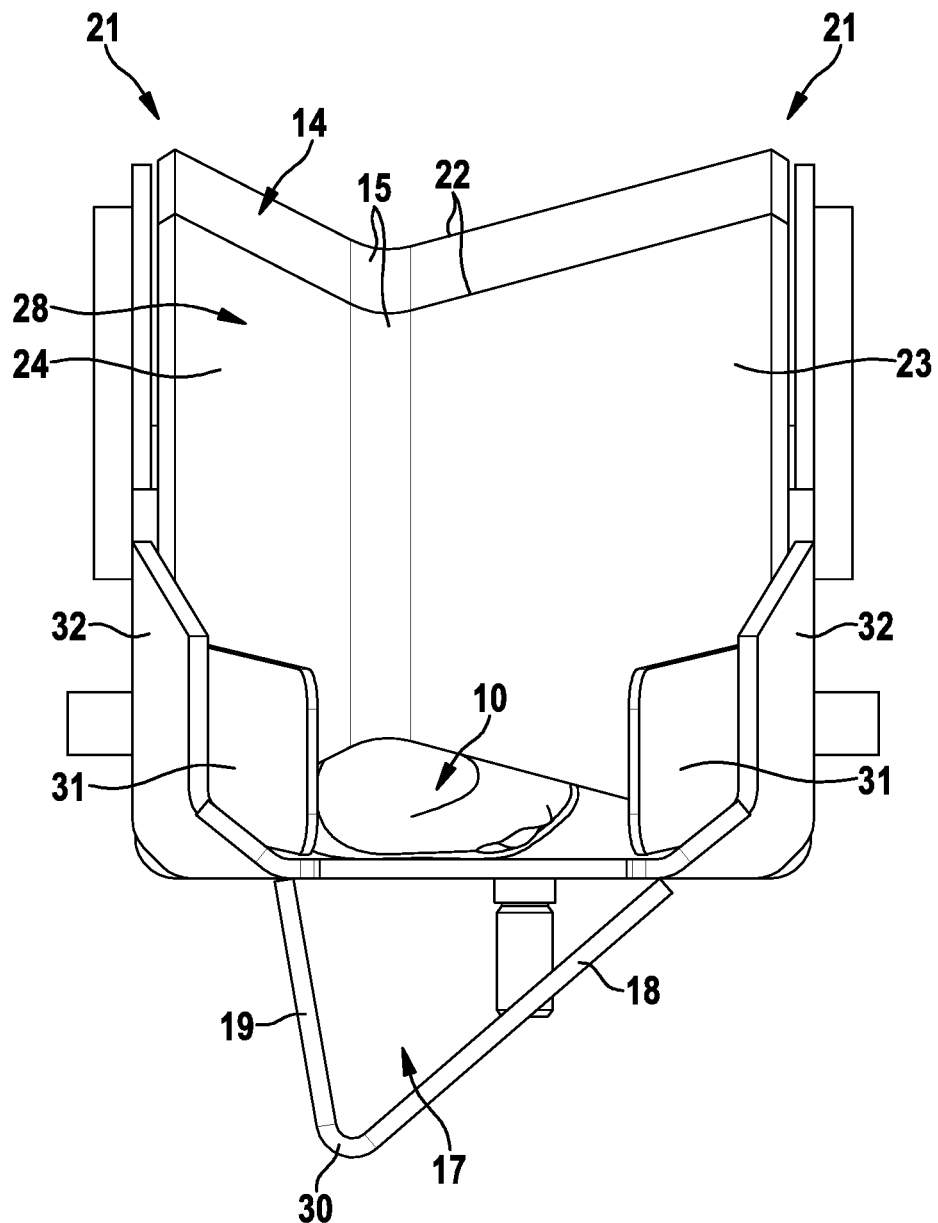
FIG. 2B shows a lateral view viewed counter to the conveying direction further downstream in the apparatus than in FIG. 1B.
Figure 2C:
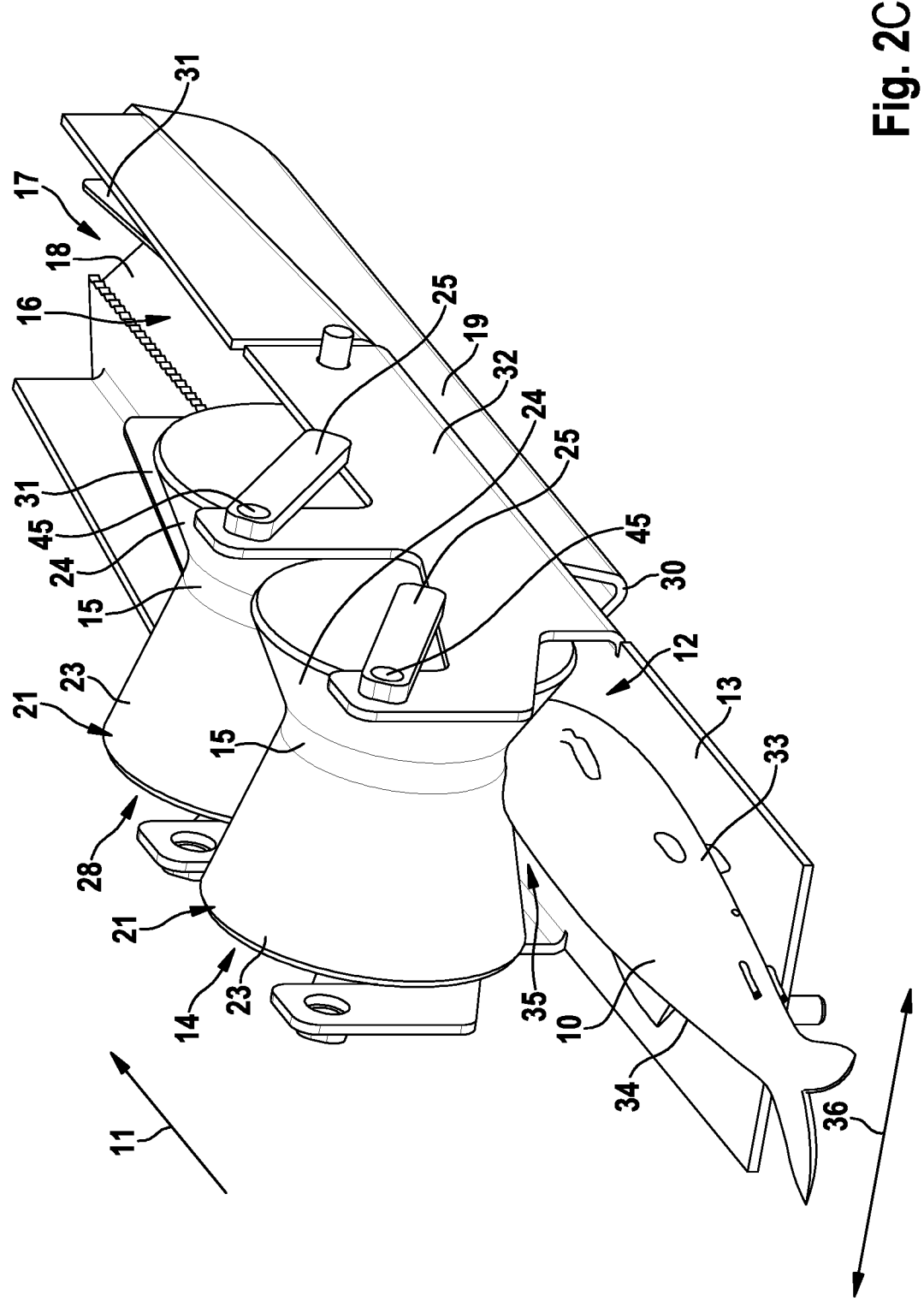
FIG. 2C is a perspective view viewed in the conveying direction further downstream in the apparatus than in FIG. 1C.

As shown in FIGS. 1a, 1b and 1c, the fish 10 first comes into engagement with the guide roller 14. Transverse positioning of the fish 10 takes place due to the previously described geometry of the guide roller 14. It can be seen from FIGS. 2a, 2b and 2c, that the fish 10 is aligned from its infeed position 35—cf. FIGS. 1a, 1b and 1c—to a transverse alignment position, as shown in FIGS. 2a, 2b and 2c, transverse to the conveying direction 11. The fish 10 is aligned in the transverse direction by means of the guide roller 14 such that the region of greatest width of the fish 10 is located in the region of the section 15 with reduced cross-sectional diameter of the guide roller 14.

Figure 3A:
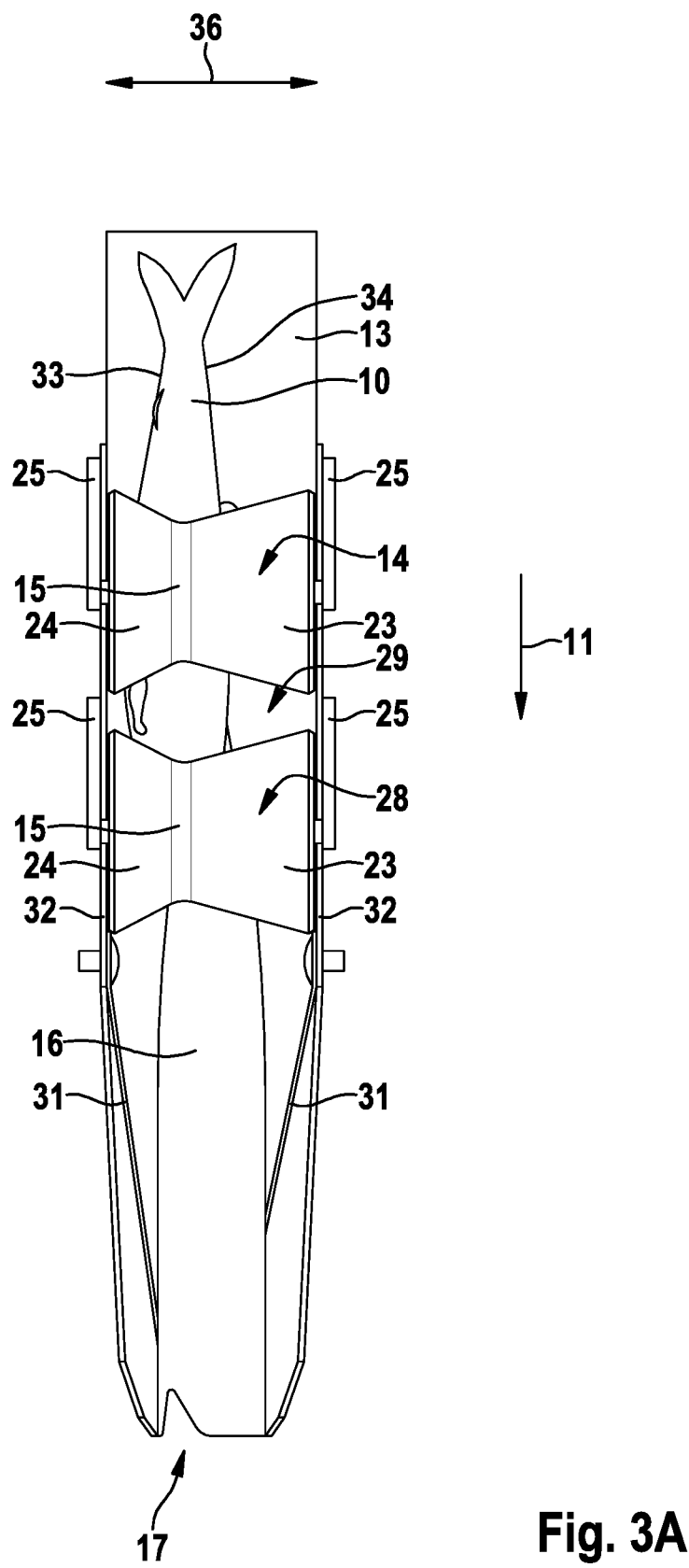
FIG. 3A shows a view from above as the fish further downstream in the apparatus than in FIG. 2A.
Figure 3B:
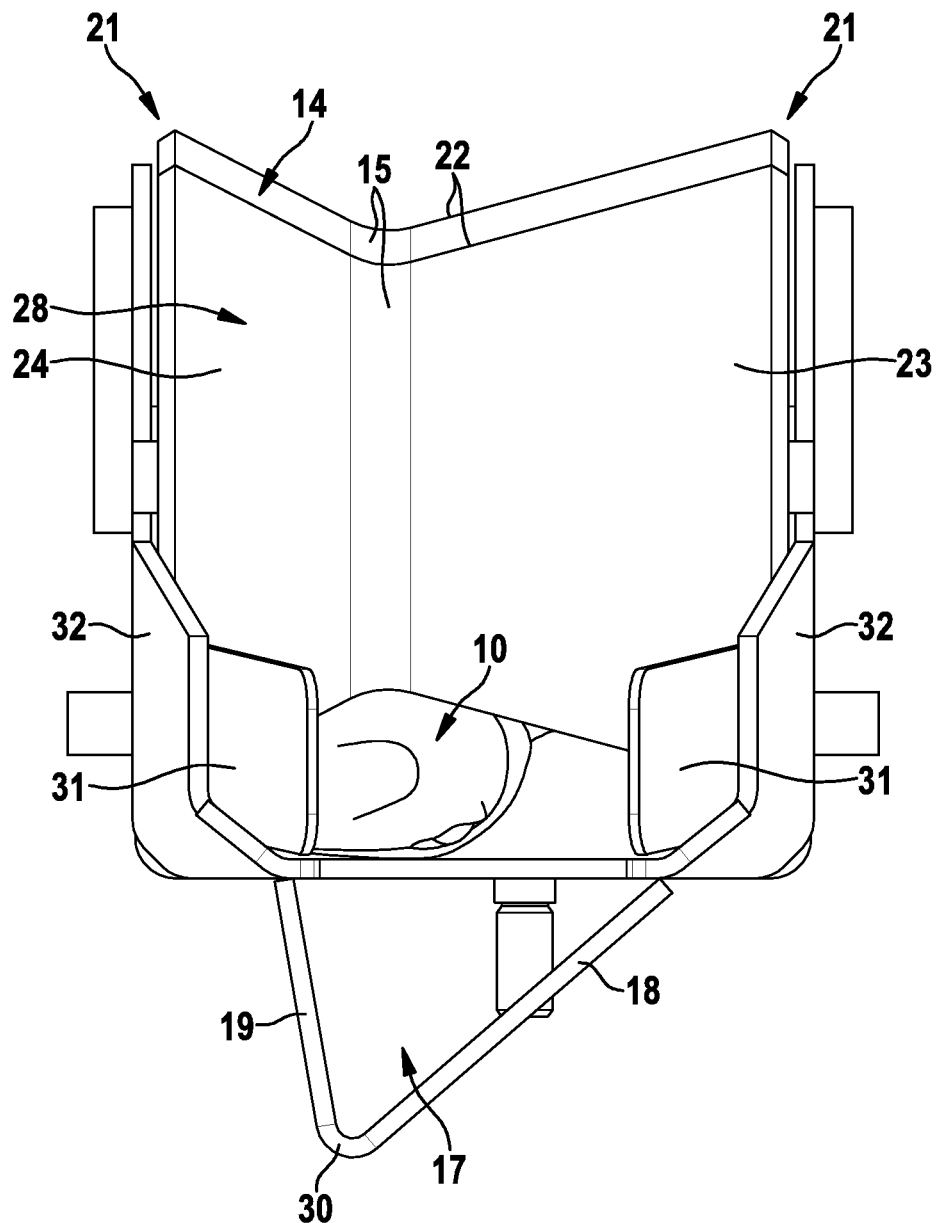
FIG. 3B shows a lateral view viewed counter to the conveying direction further downstream in the apparatus than in FIG. 2B.
Figure 3C:
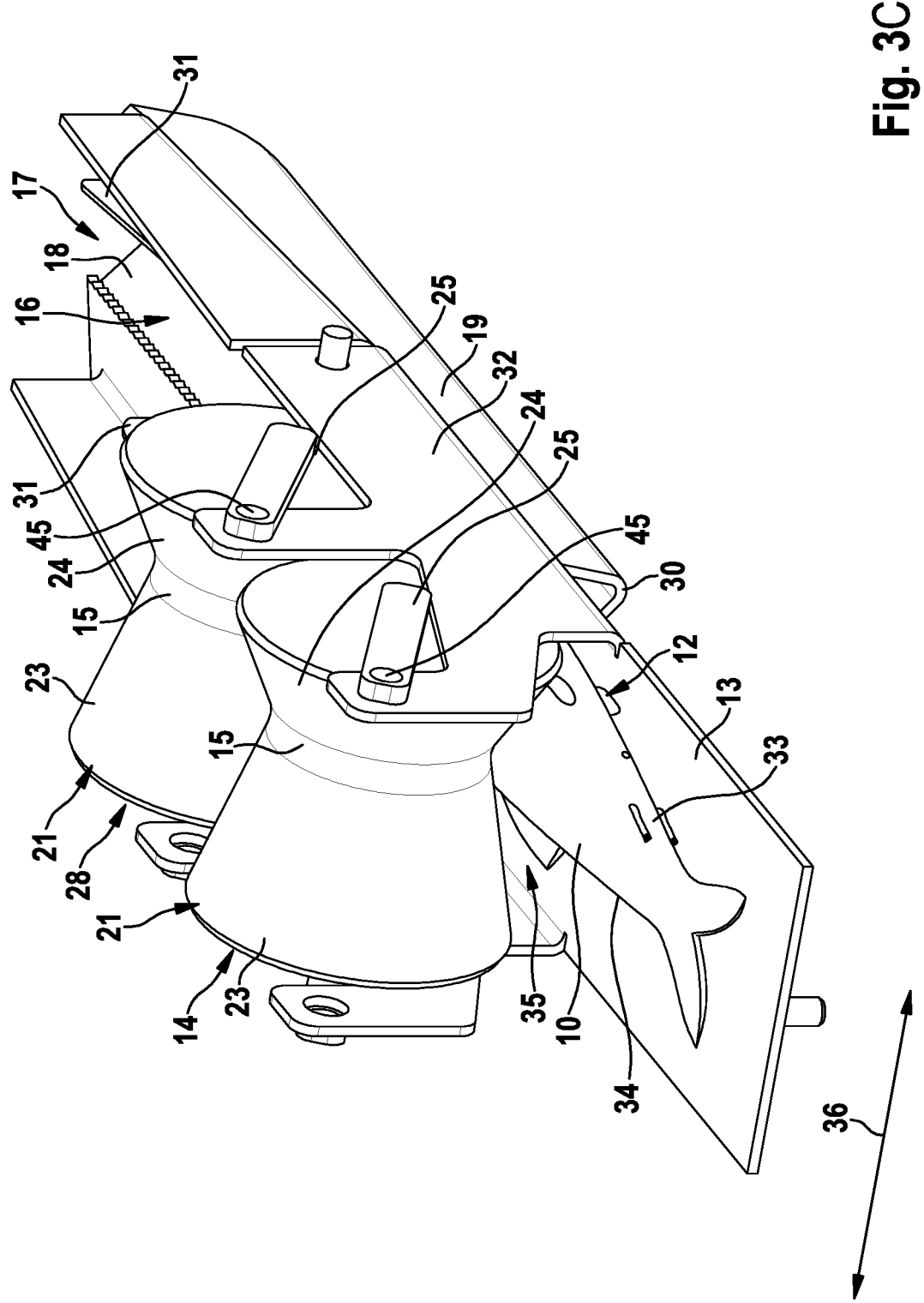
FIG. 3C is a perspective view viewed in the conveying direction further downstream in the apparatus than in FIG. 2C.

As shown in FIGS. 3a, 3b and 3c, the fish 10 reaches the transfer recess 16 with its head 37. The further guide roller 28 helps to maintain the transverse position of the fish 10 even in the region of the transfer recess 16.

Figure 4A:
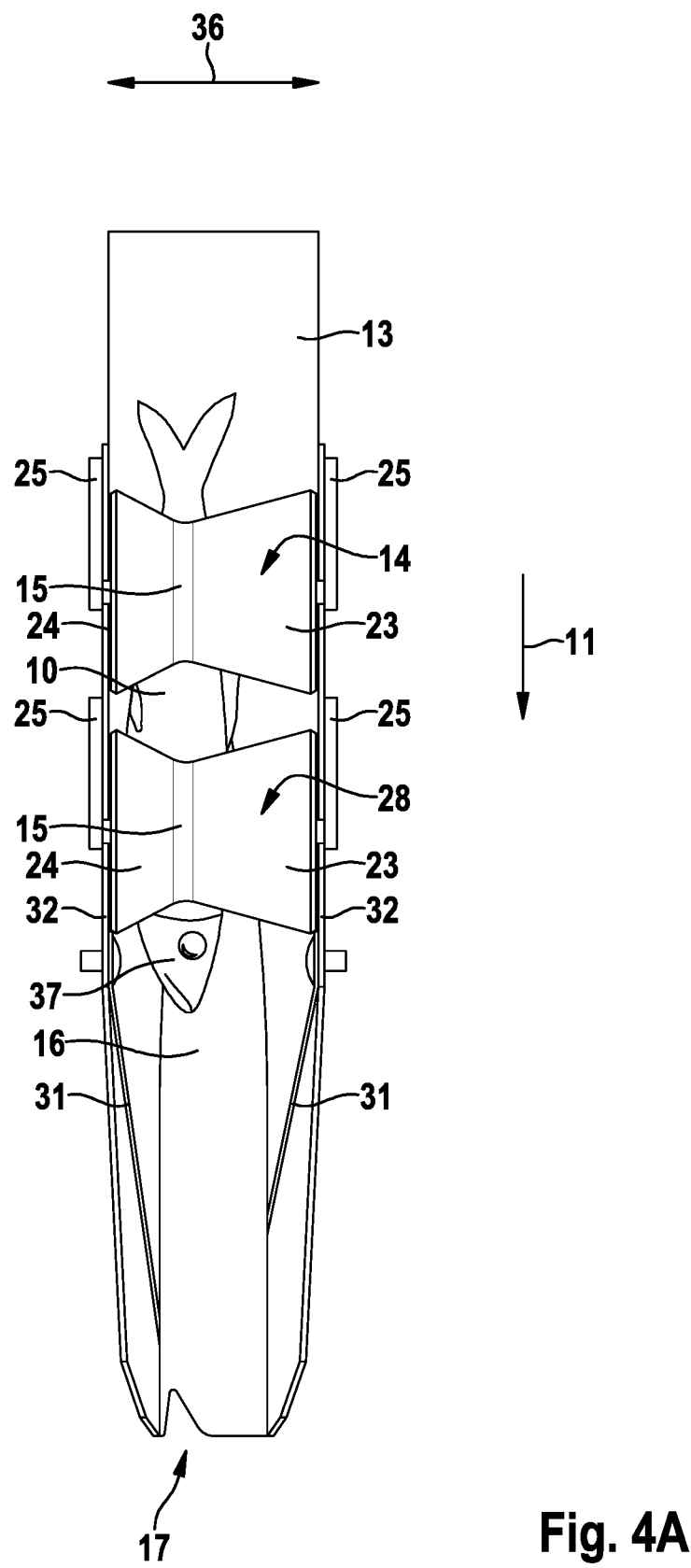
FIG. 4A shows a view from above as the fish further downstream in the apparatus than in FIG. 3A.
Figure 4B:
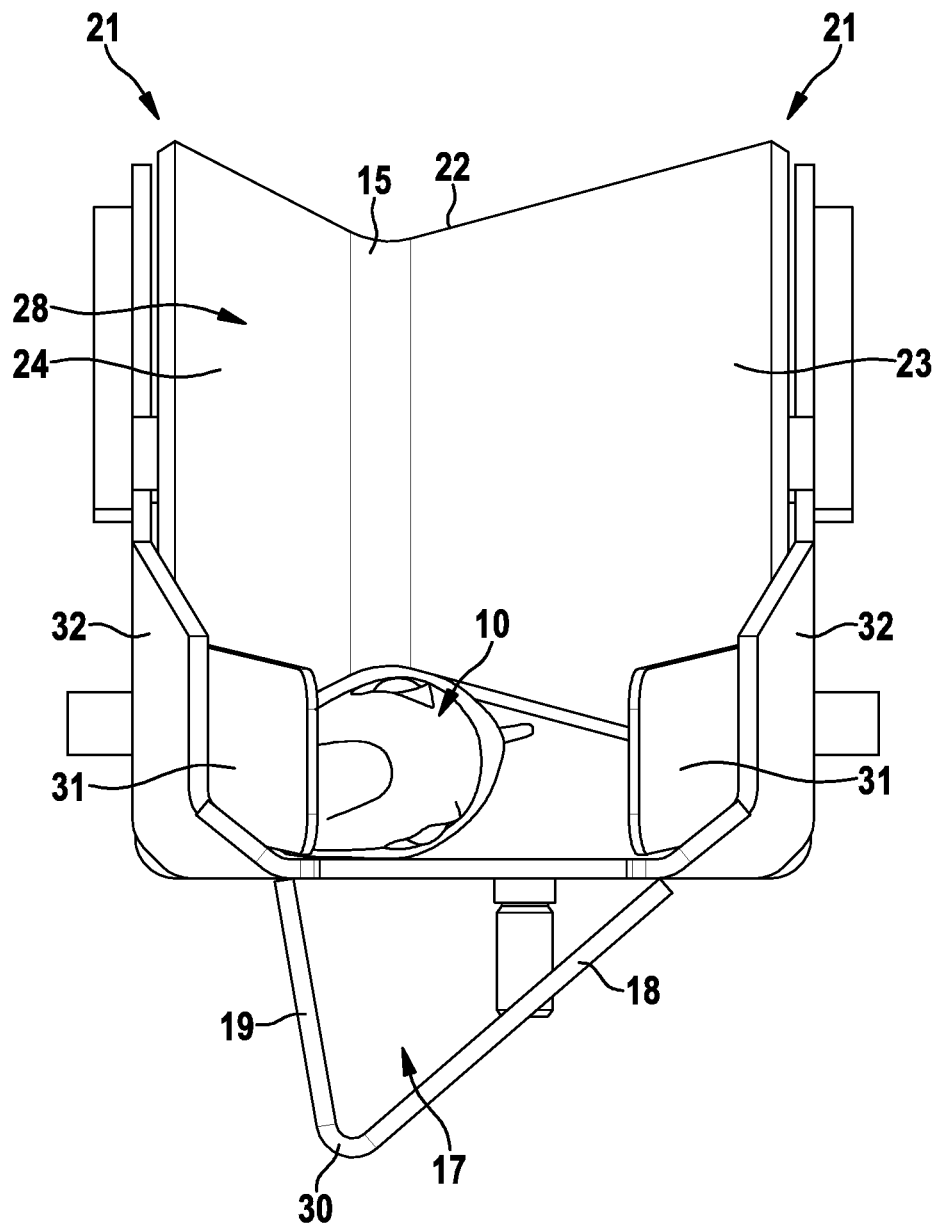
FIG. 4B shows a lateral view viewed counter to the conveying direction further downstream in the apparatus than in FIG. 3B.
Figure 4C:
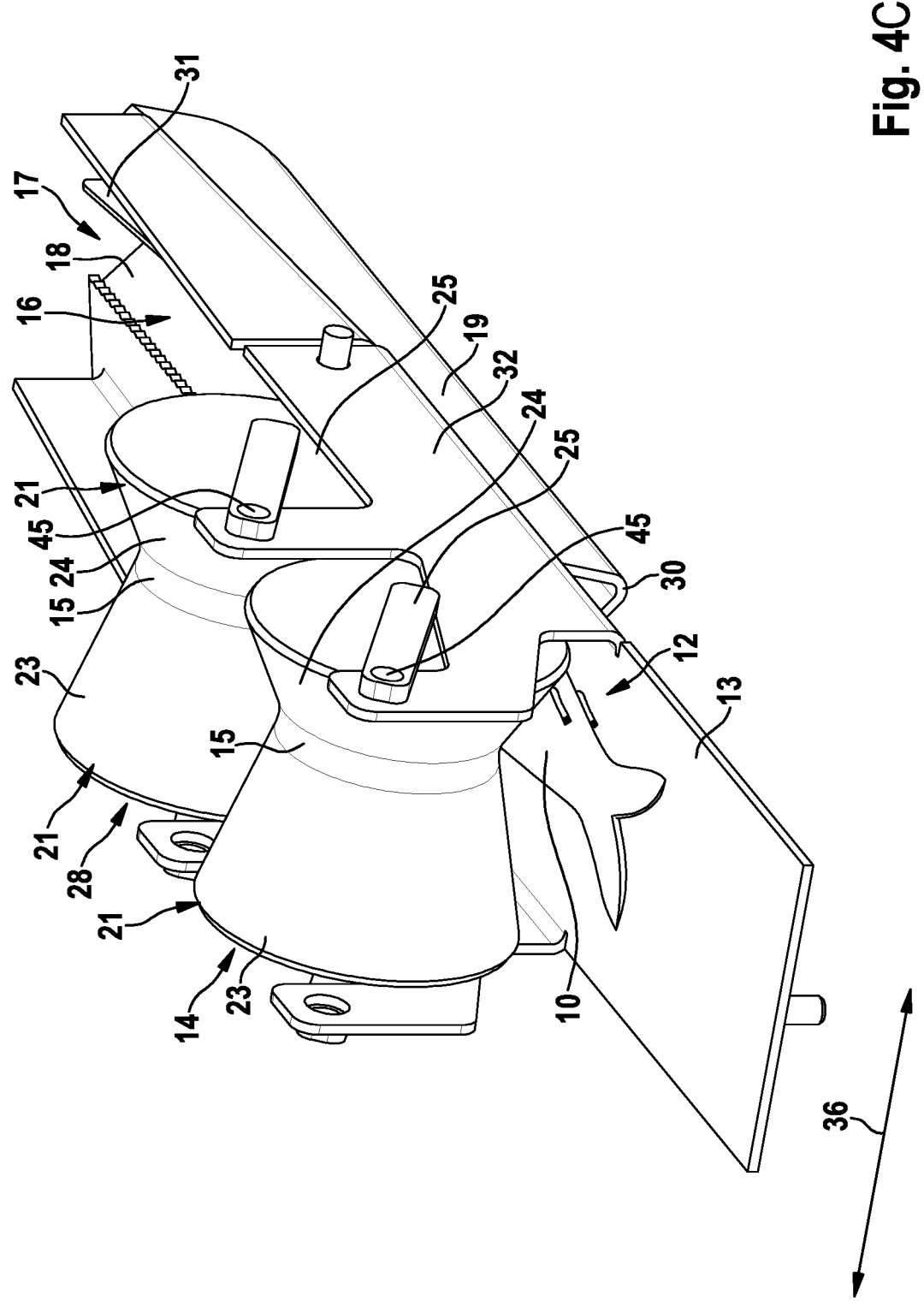
FIG. 4C is a perspective view viewed in the conveying direction further downstream in the apparatus than in FIG. 3C.

In FIGS. 4a, 4b and 4c, it can clearly be seen that the fish 10 constantly retains the transverse alignment position 36 once reached, even if it is already located partly above the transfer recess 16 and is no longer supported by the channel floor 13.

Figure 5A:
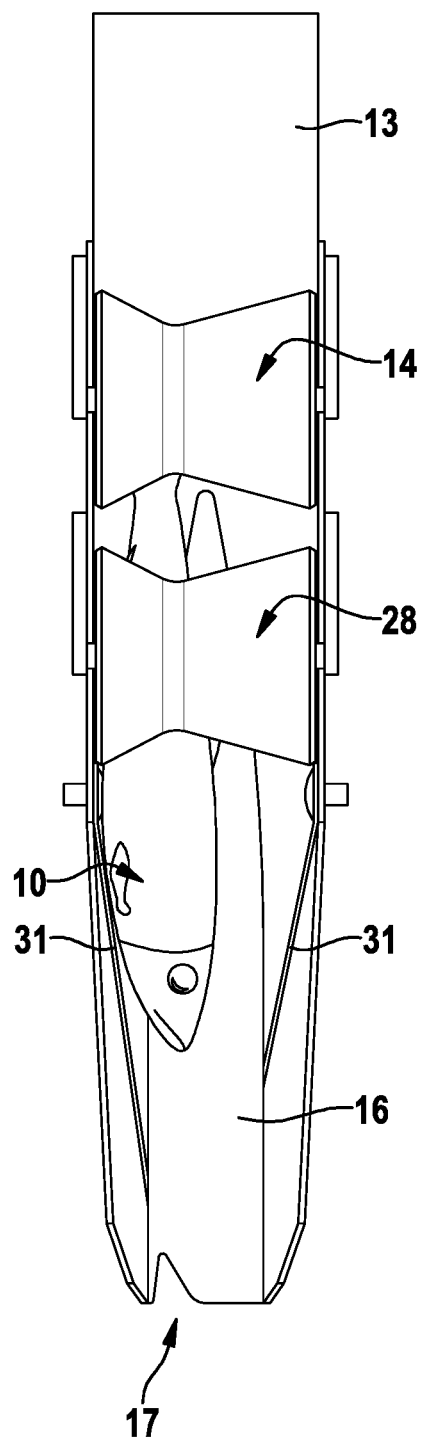
FIG. 5A shows a view from above as the fish further downstream in the apparatus than in FIG. 4A.
Figure 5B:
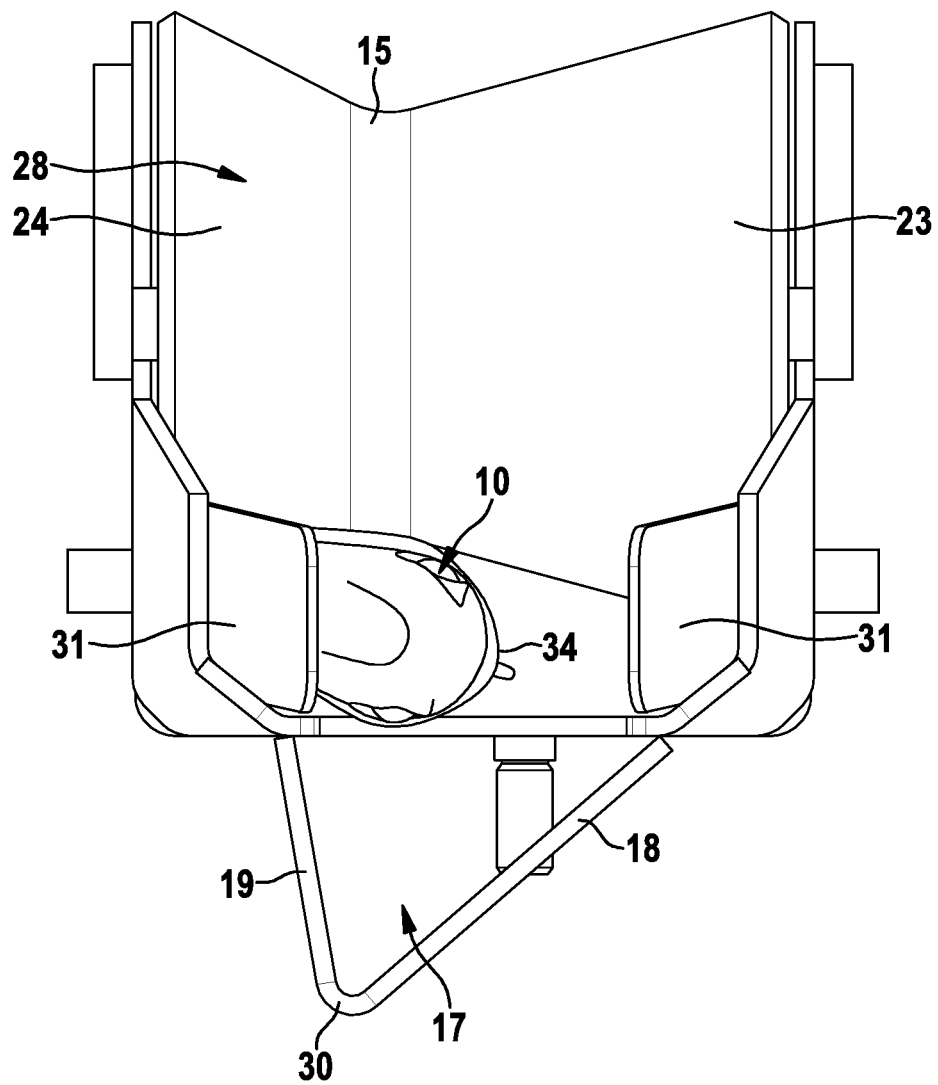
FIG. 5B shows a lateral view viewed counter to the conveying direction further downstream in the apparatus than in FIG. 4B.

FIGS. 5a and 5b show a first snapshot in which the fish 10 has already been conveyed so far in conveying direction 11 that the widening of the transfer recess 16 has reached an extent which makes it impossible for the fish 10 to be completely supported by the channel floor 13. The fish 10 now tilts with its dorsal side 34 first, following the force of gravity, in the direction of the guiding channel floor 30. As a result, the fish 10 receives a rotational impulse about its longitudinal axis.

For the sake of greater clarity, the figures of groups 6 to 14 do not include a complete reproduction of all reference numbers. The figures illustrated each show different stages in the passage of one of the fish 10 in conveying direction 11 and are therefore mostly identical.

Figure 6A:
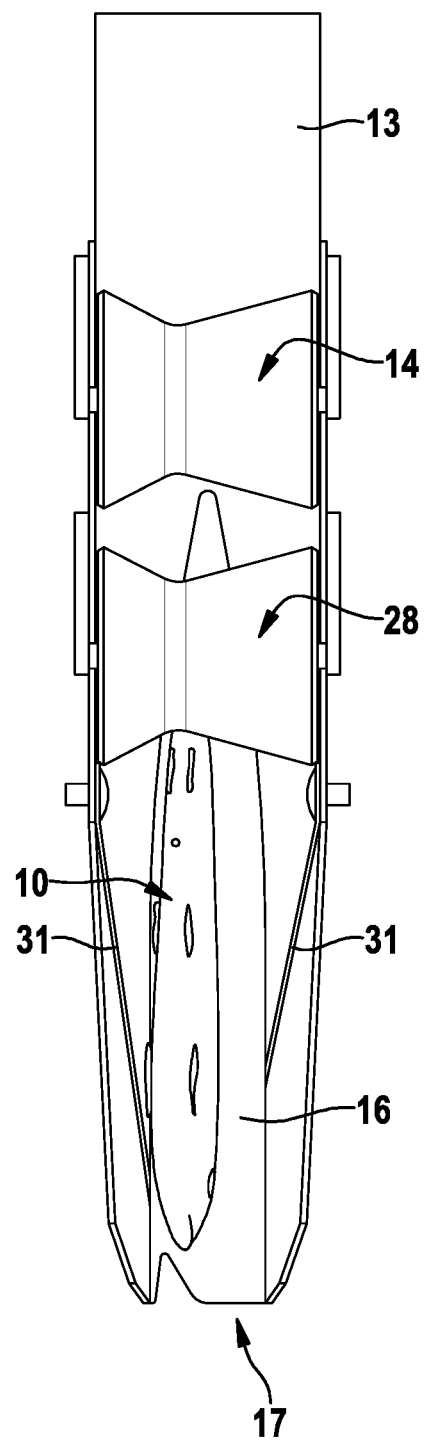
FIG. 6A shows a view from above as the fish further downstream in the apparatus than in FIG. 5A.
Figure 6B:
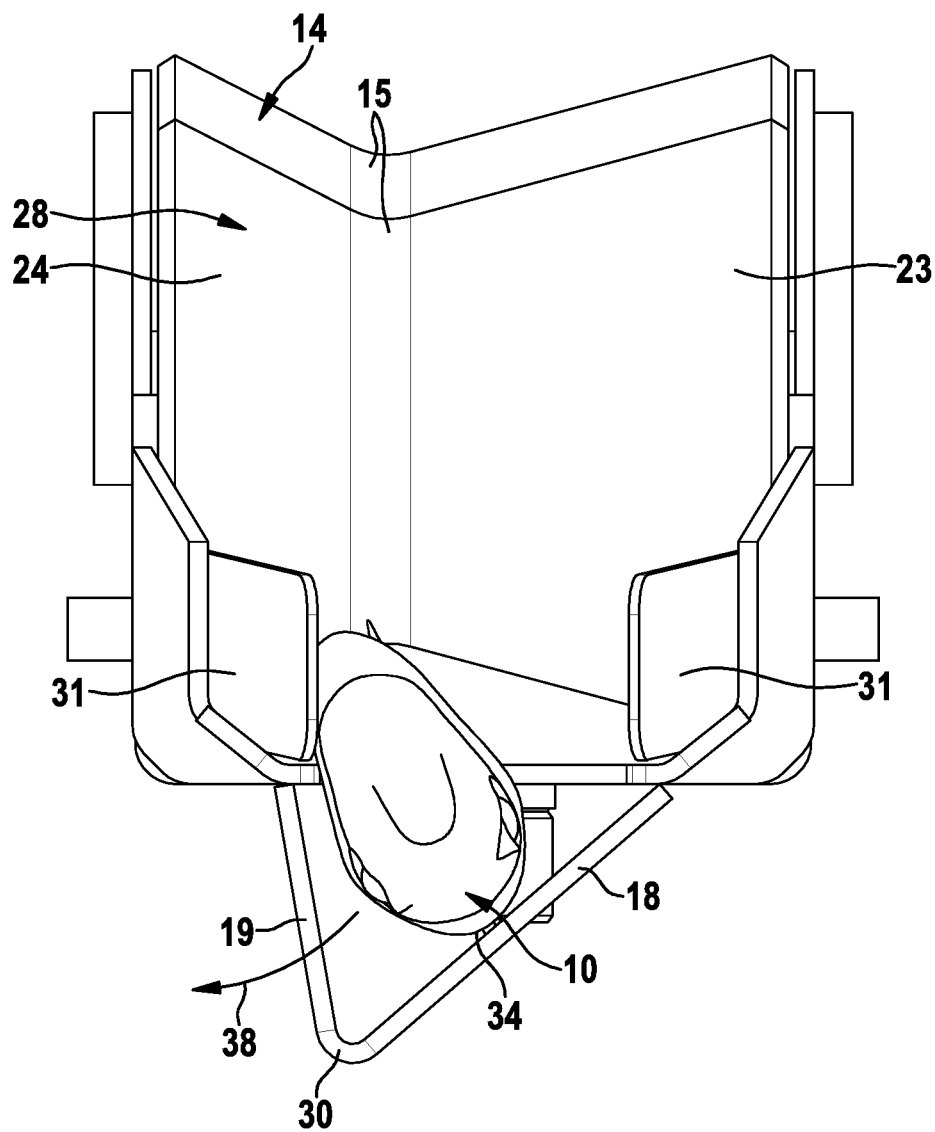
FIG. 6B shows a lateral view viewed counter to the conveying direction further downstream in the apparatus than in FIG. 5B.

FIGS. 6a and 6b show a snapshot in which the fish 10 rests with its dorsal side 34 on the lateral guide surface 18 of the guiding channel 17. Due to the rotational impulse present and the inclination of the lateral guide surface 18, the fish 10 slides into the position shown in FIGS. 7a and 7b with further rotation in the direction of the arrow 38.

Figure 7A:
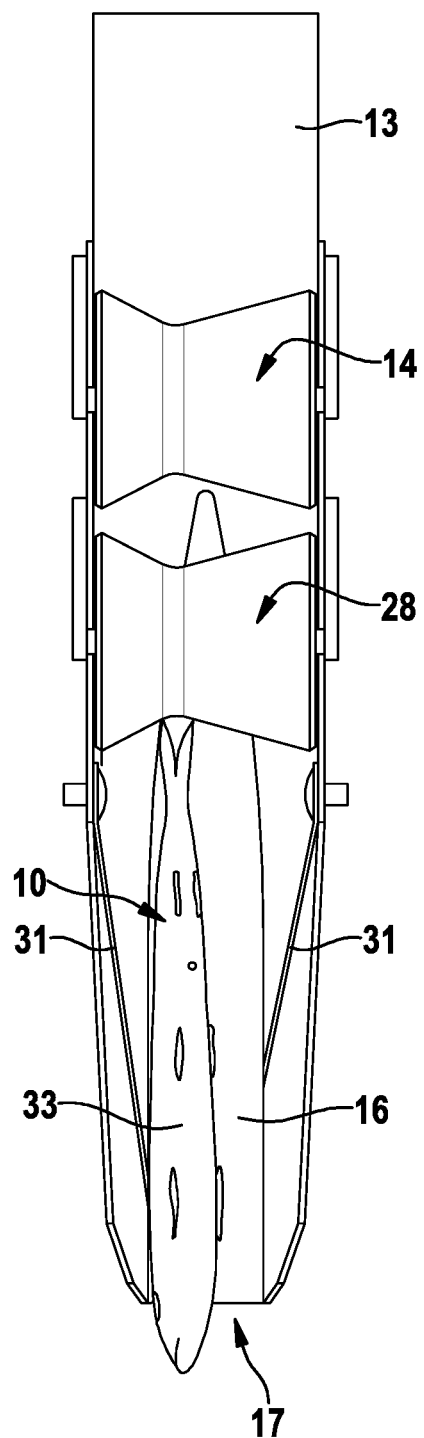
FIG. 7A shows a view from above as the fish further downstream in the apparatus than in FIG. 6A.
Figure 7B:
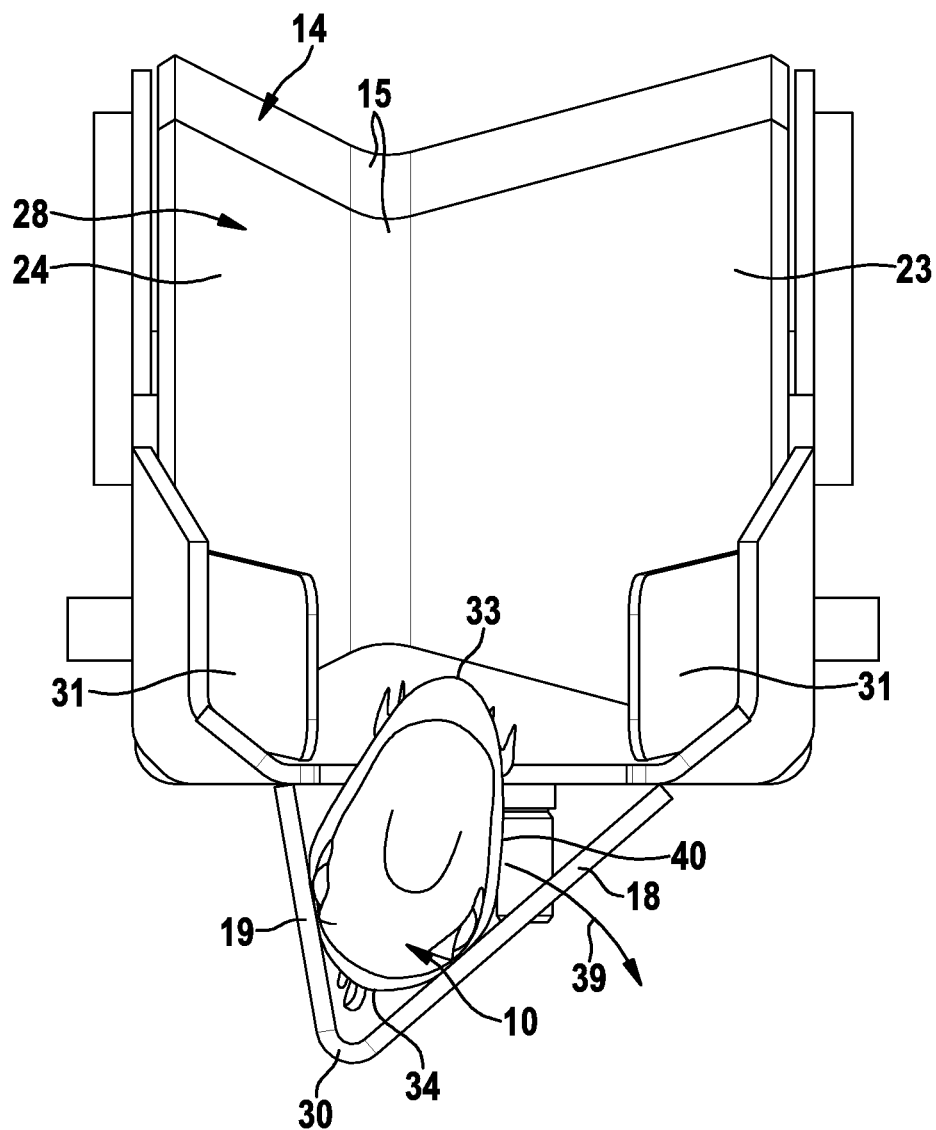
FIG. 7B shows a lateral view viewed counter to the conveying direction further downstream in the apparatus than in FIG. 6B.

The snapshot according to FIGS. 7a and 7b shows the fish 10 on reaching the position described above. The fish 10 finally tilts from this position in the direction of the arrow 39 towards the lateral guide surface 18 and comes to rest on it supported on its flank 40 so that the ventral side 33 is now aligned to the left with respect to the conveying direction 11 and therefore has the desired ventral/dorsal alignment.

The figure groups 8 to 14 show the passage of one of the fish 10 which already has the desired ventral/dorsal alignment, namely with the ventral side 33 towards the left with respect to the conveying direction 11.

Figure 8A:
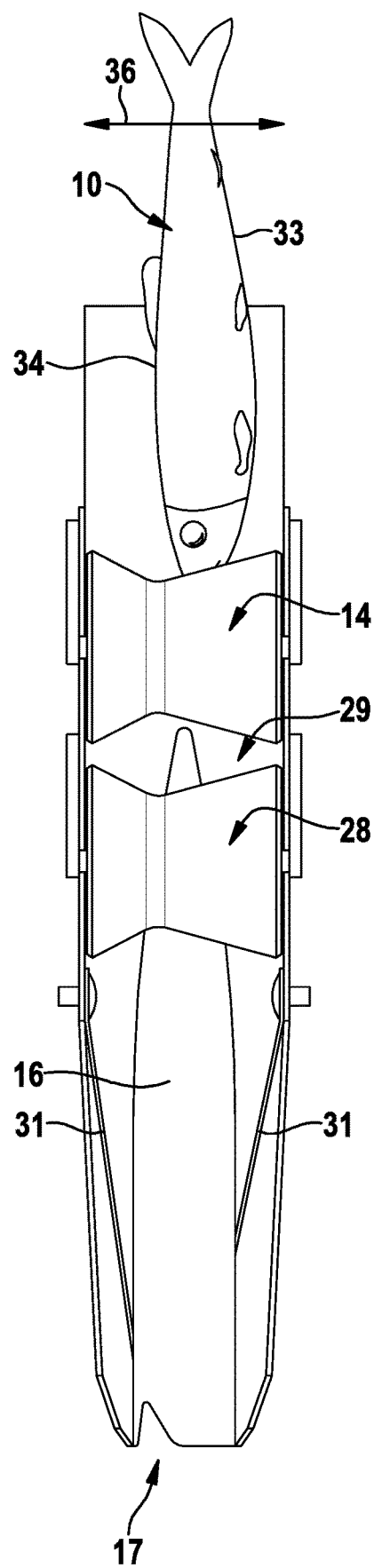
FIG. 8A shows a view from above as the fish, which has the desired alignment of the ventral/dorsal position, enters the apparatus according to the invention.
Figure 8B:
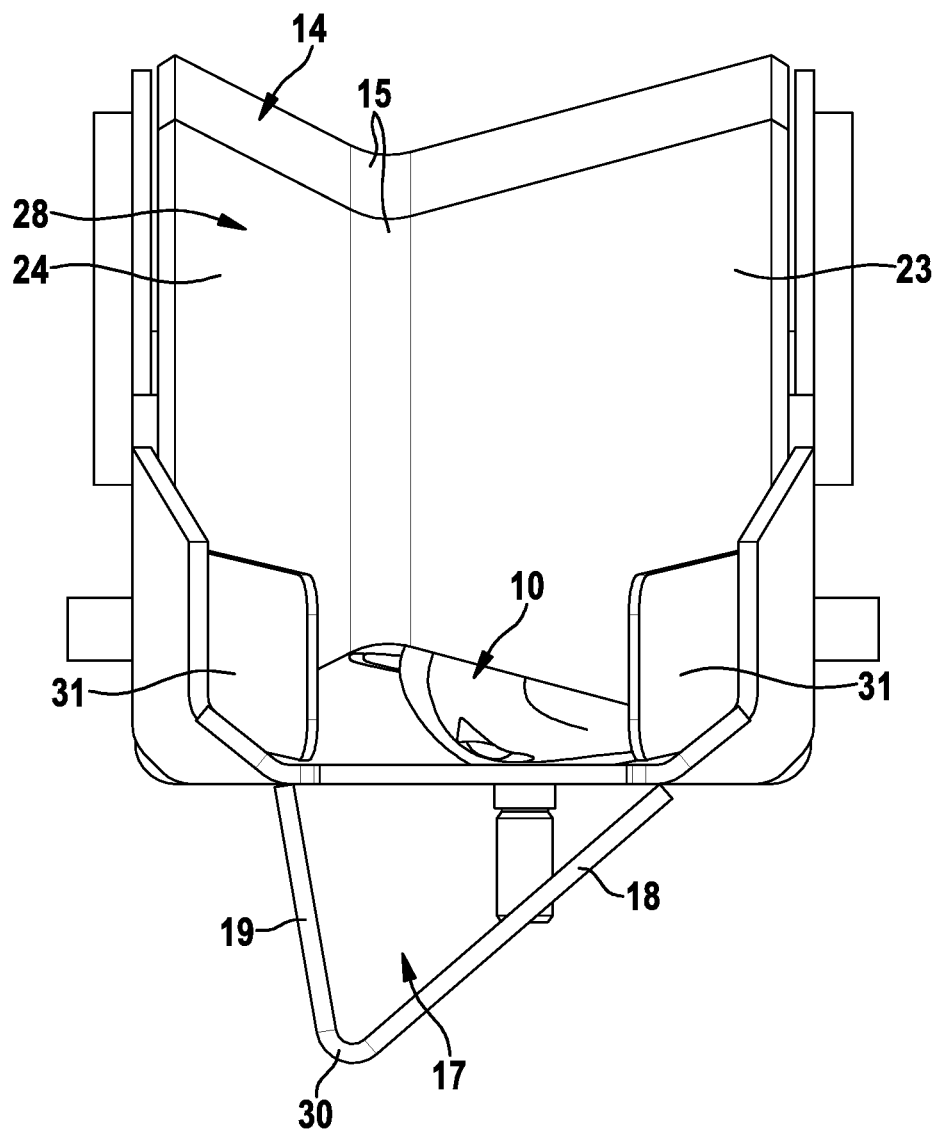
FIG. 8B shows a lateral view viewed counter to the conveying direction.
Figure 8C:
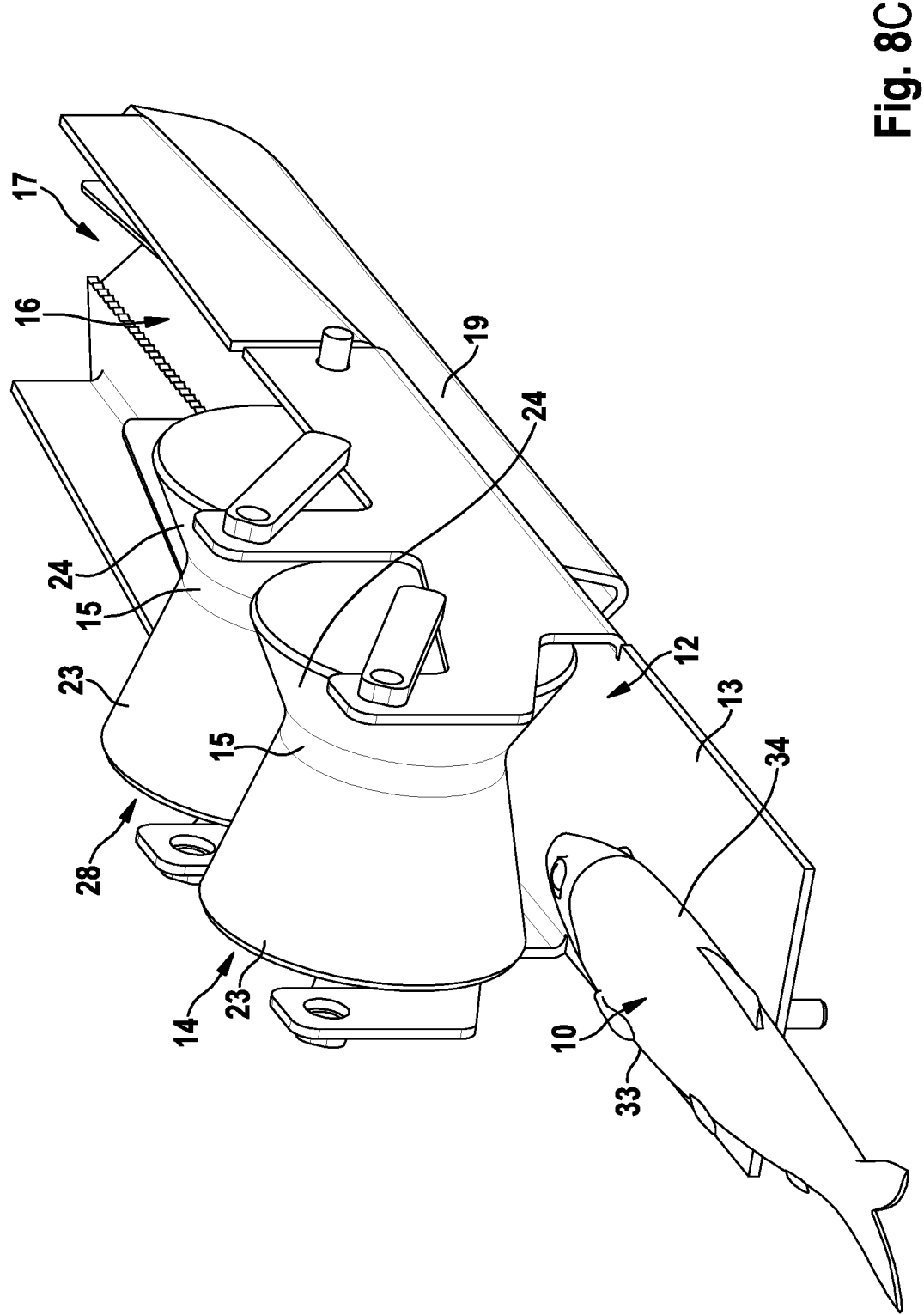
FIG. 8C is a perspective view viewed in the conveying direction.
Figure 9A:
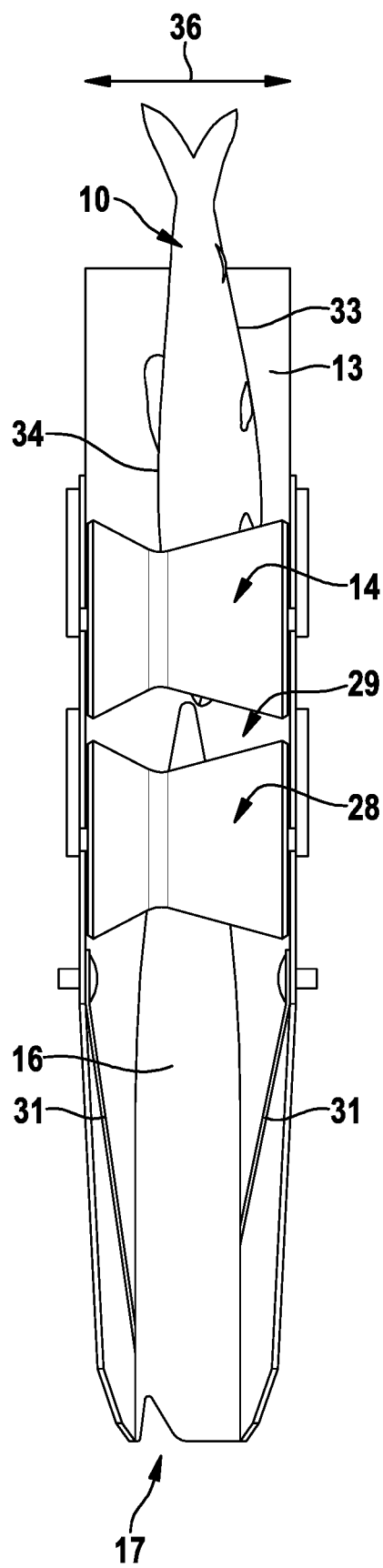
FIG. 9A shows a view from above as the fish further downstream in the apparatus than in FIG. 8A.
Figure 9B:
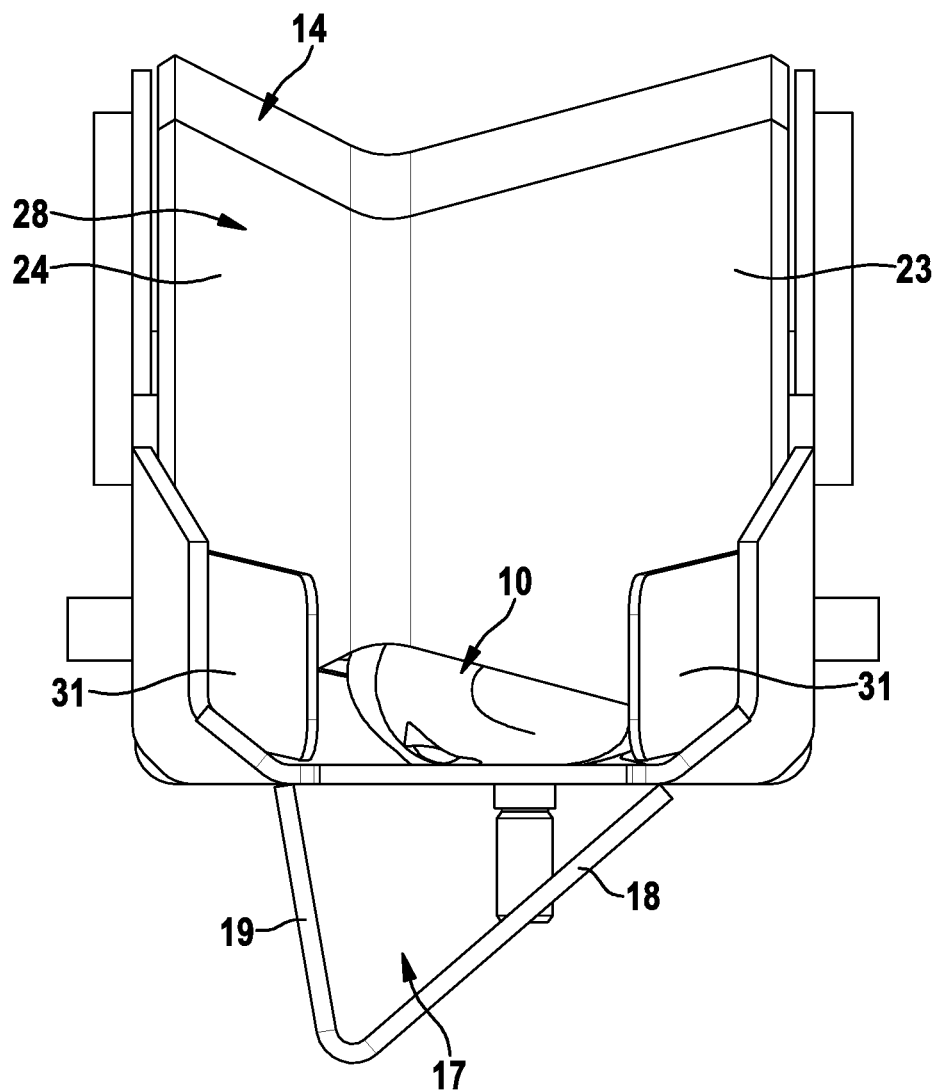
FIG. 9B shows a lateral view viewed counter to the conveying direction further downstream in the apparatus than in FIG. 8B.
Figure 9C:
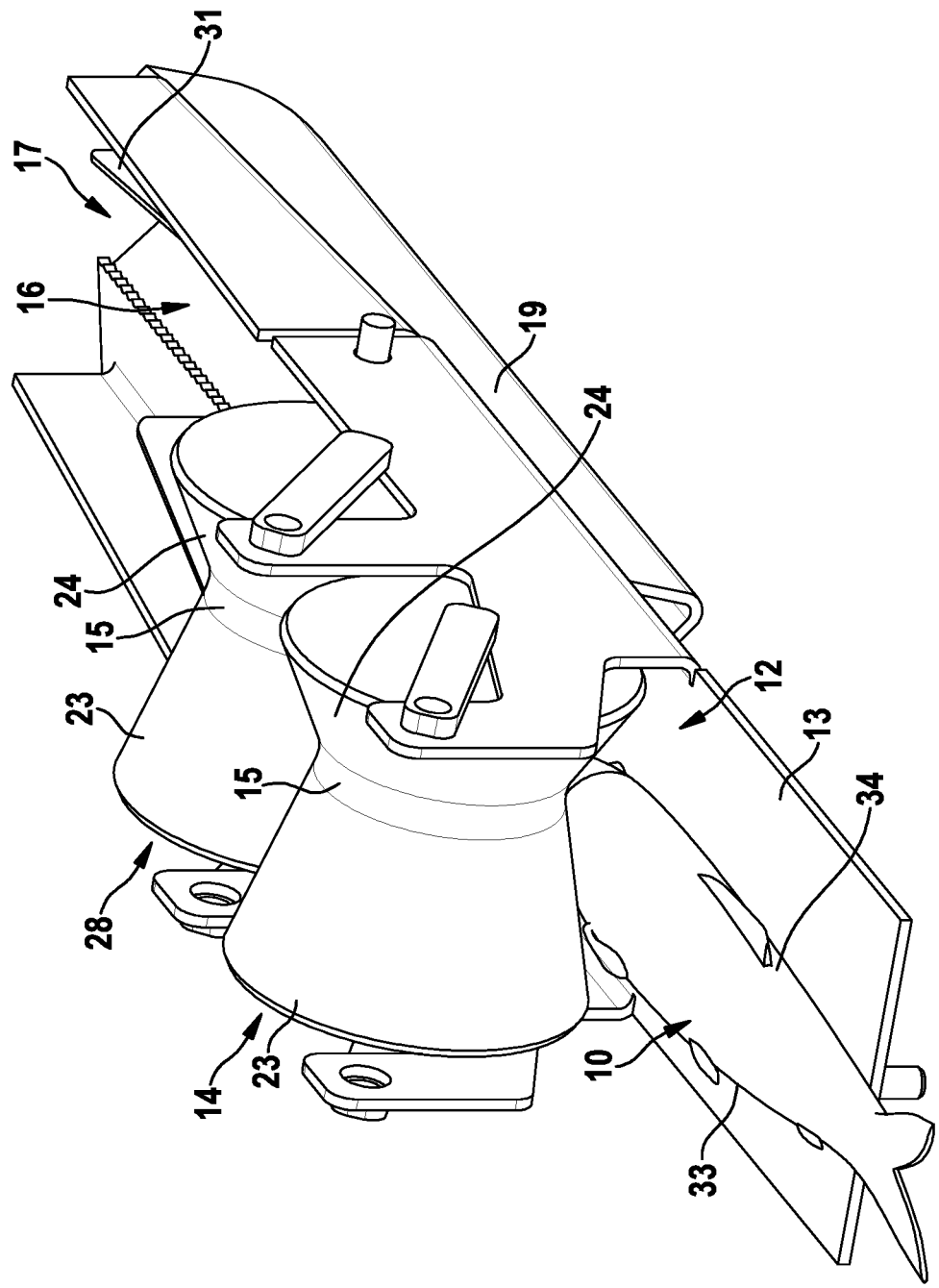
FIG. 9C is a perspective view viewed in the conveying direction further downstream in the apparatus than in FIG. 8C.

FIGS. 8a, 8b and 8c show that the fish 10—viewed in the conveying direction 11—is aligned with its ventral side 33 already towards the left, while the dorsal side 34 of the fish 10 points to the right.

The fish 10 first comes into engagement with the guide roller 14. Transverse positioning of the fish 10 takes place due to the previously described geometry of the guide roller 14. In this case, the fish 10 is gradually moved to the right with respect to the conveying direction 11, as becomes clear when comparing the figure groups 8 and 9. Here too, the fish 10 is aligned in the transverse direction by means of the guide roller 14 such that the region of greatest width of the fish 10 is located in the region of the section 15 with reduced cross-sectional diameter of the guide roller 14. As a result, due to the fish geometry and feed-in of the fish 10 which has taken place with the correct ventral/dorsal alignment, this means that the fish 10 is conveyed approximately centrally, aligned with the transfer recess 16.

Figure 10A:
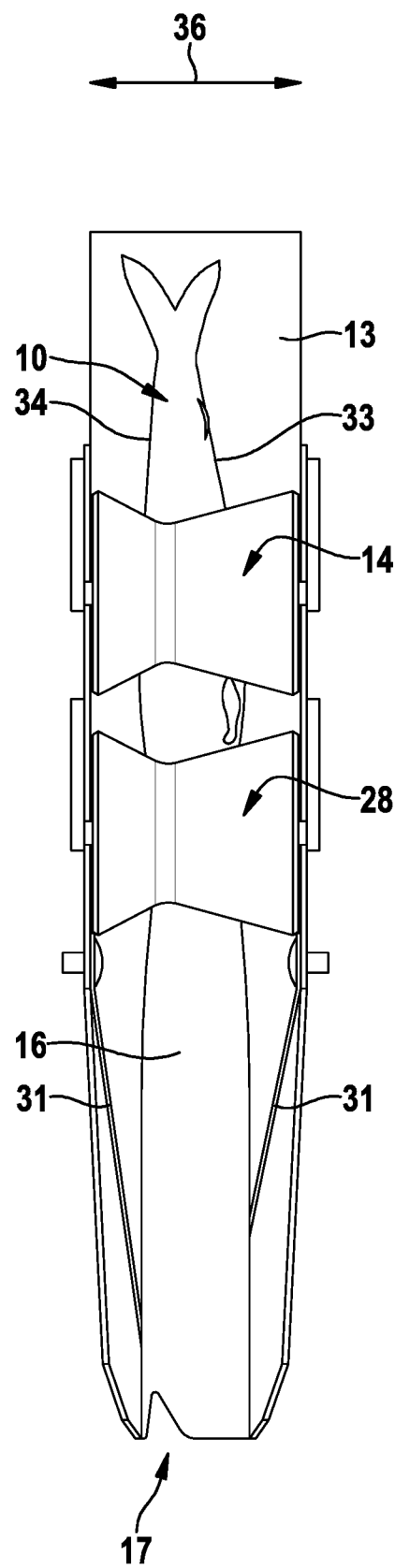
FIG. 10A shows a view from above as the fish further downstream in the apparatus than in FIG. 9A.
Figure 10B:
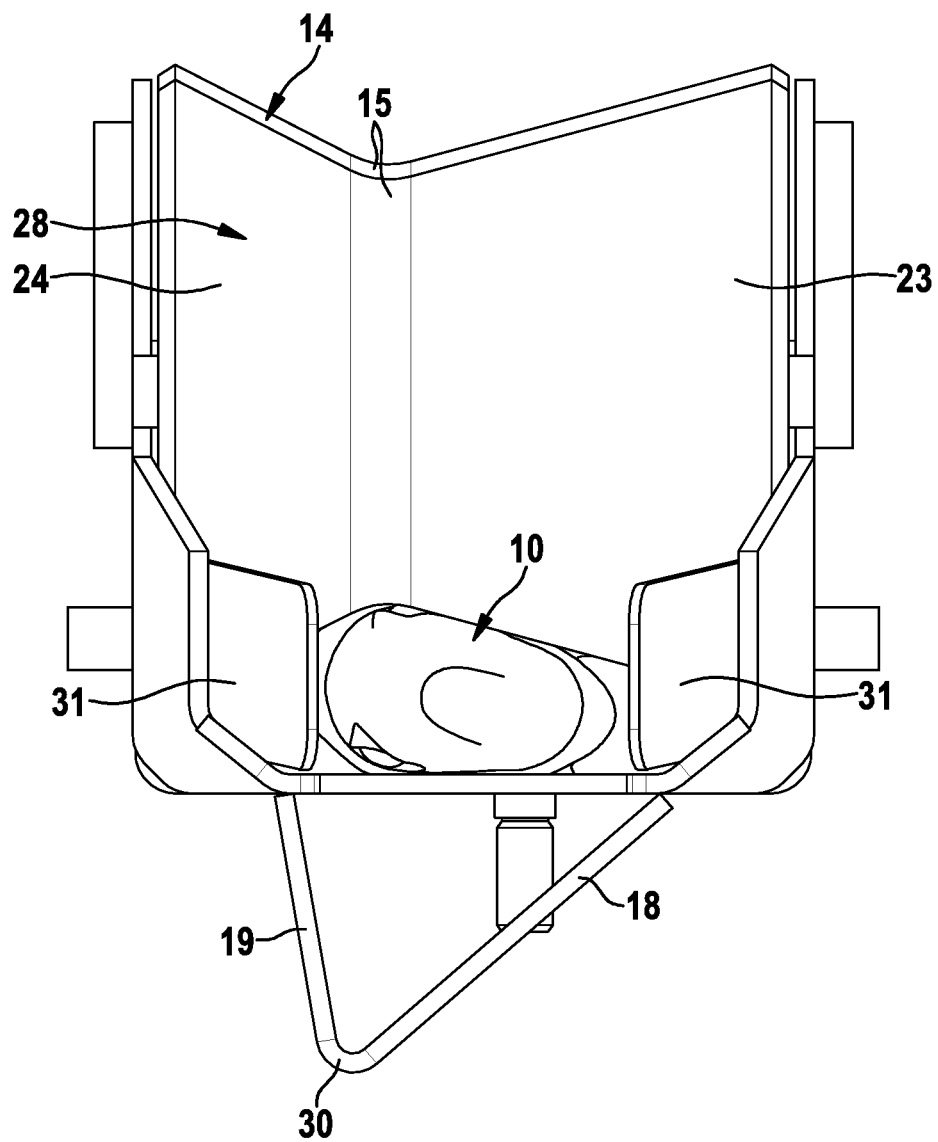
FIG. 10B shows a lateral view viewed counter to the conveying direction further downstream in the apparatus than in FIG. 9B.
Figure 10C:
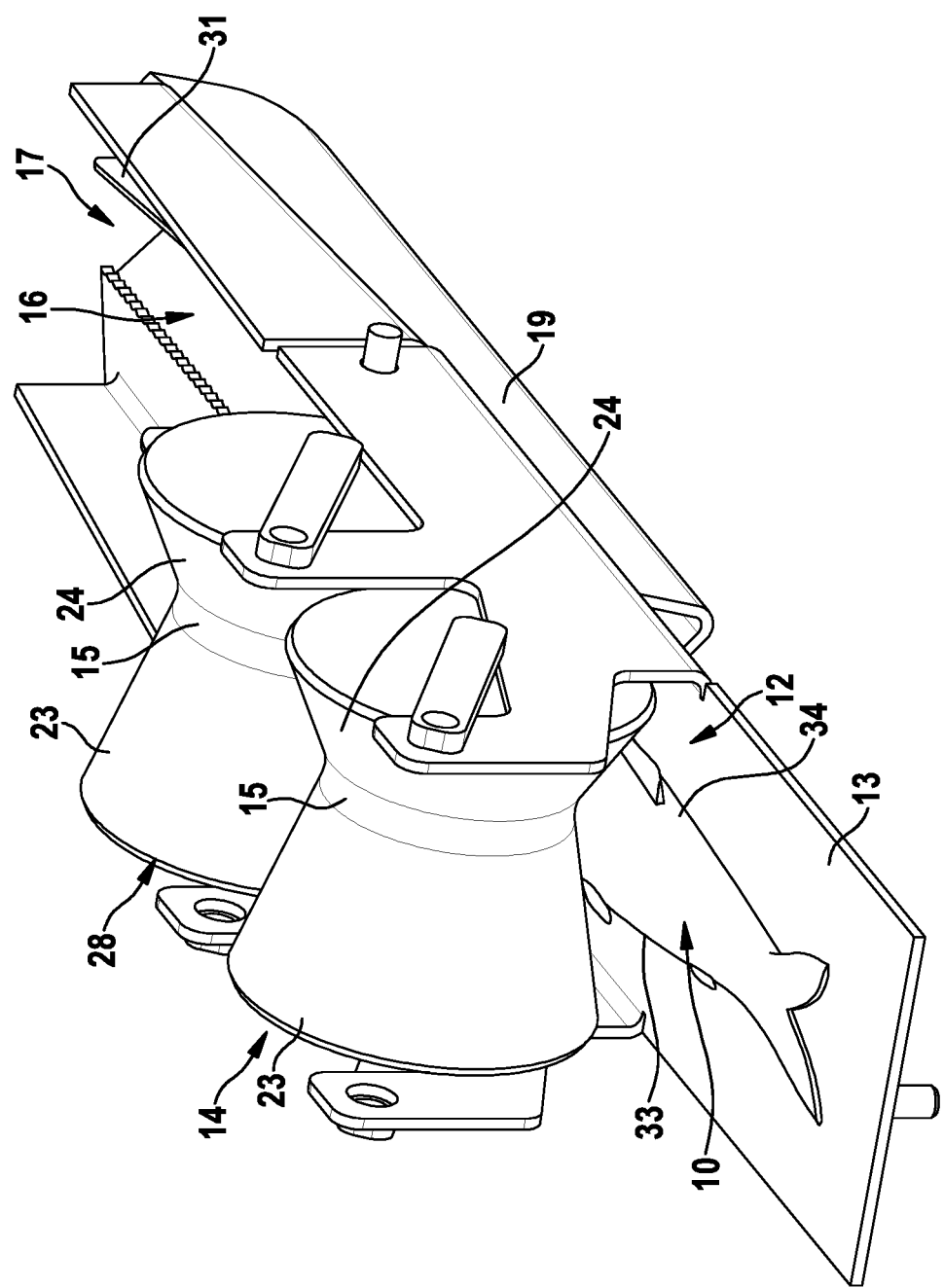
FIG. 10C is a perspective view viewed in the conveying direction further downstream in the apparatus than in FIG. 9C.

A comparison of the transverse alignment position 36 of the fish 10 shown in FIG. 10b with the transverse alignment position 36 shown in FIG. 4b clearly shows the differences.

Figure 11A:
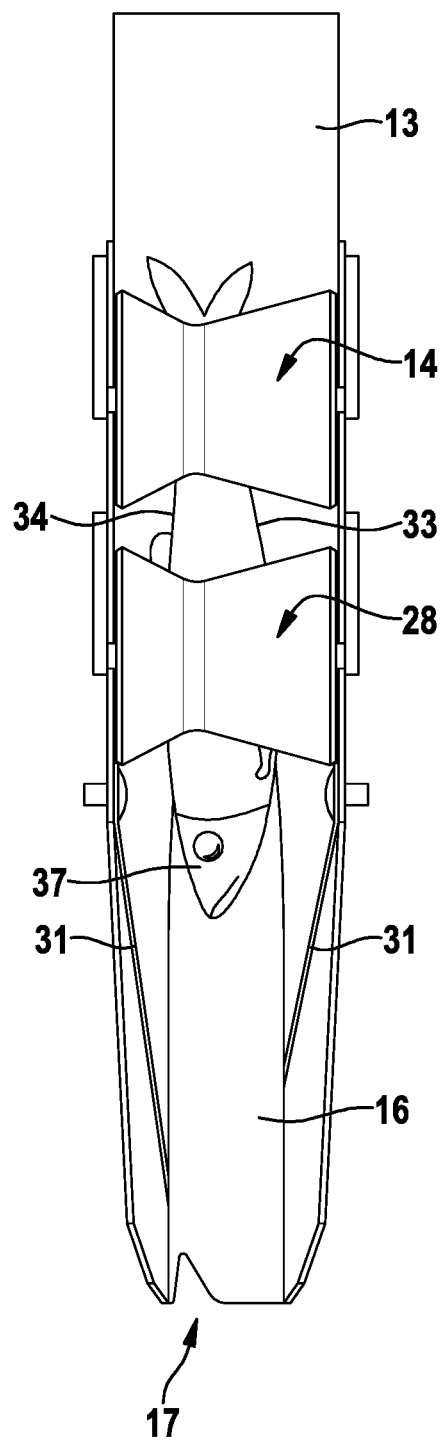
FIG. 11A shows a view from above as the fish further downstream in the apparatus than in FIG. 10A.
Figure 11B:
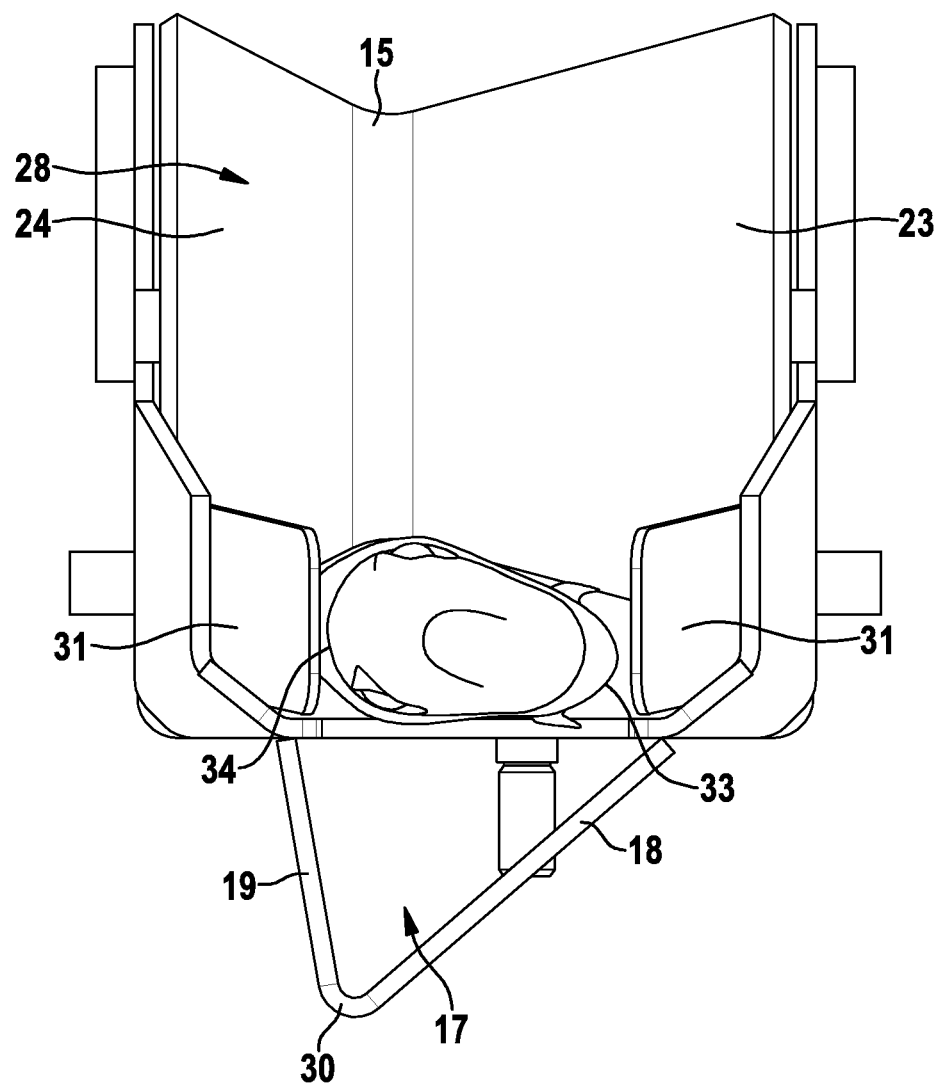
FIG. 11B shows a lateral view viewed counter to the conveying direction further downstream in the apparatus than in FIG. 10B.
Figure 11C:
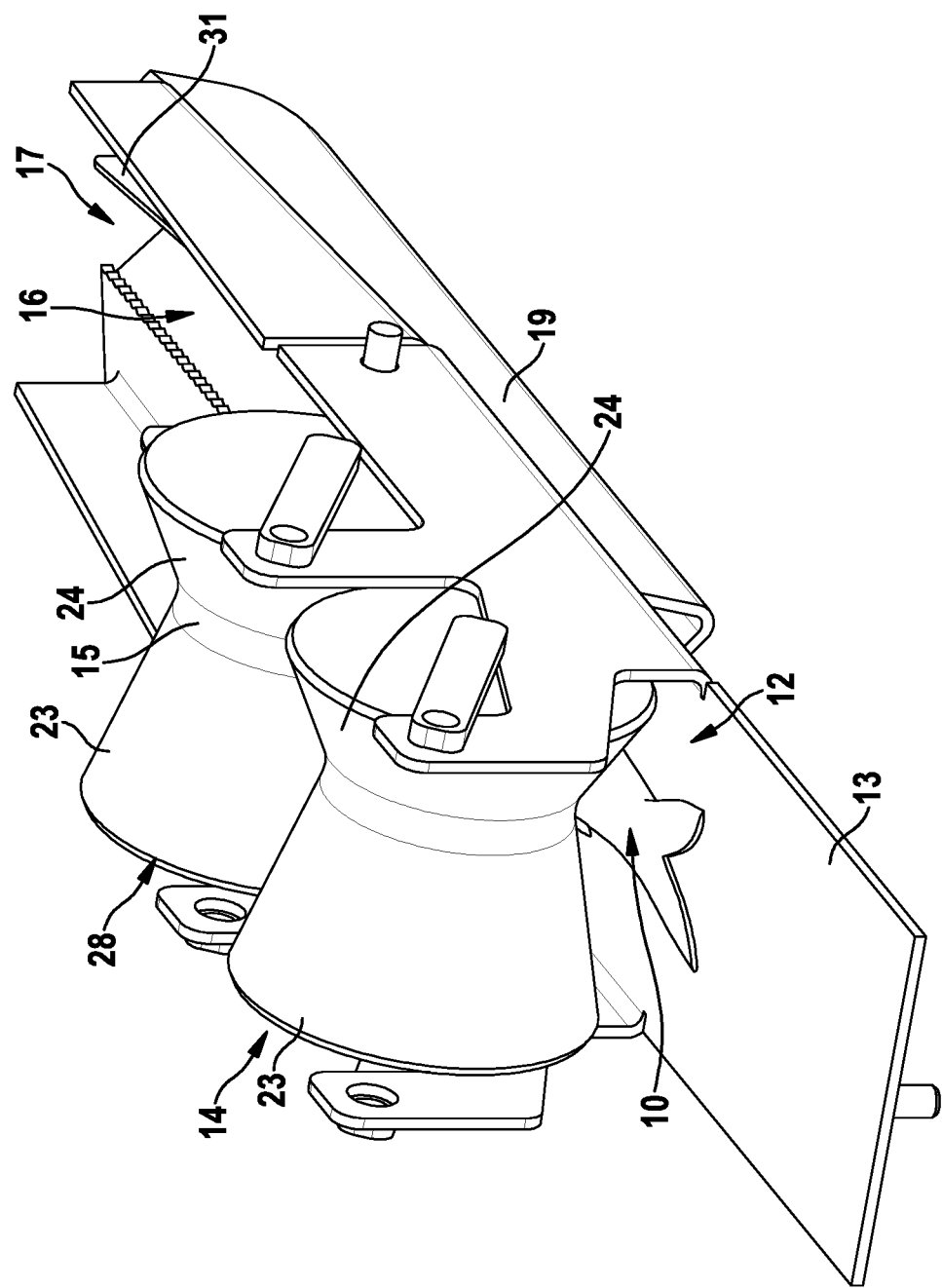
FIG. 11C is a perspective view viewed in the conveying direction further downstream in the apparatus than in FIG. 10C.

FIGS. 11a, 11b and 11c show how the fish 10 arrives at the transfer recess 16 centred in the middle or substantially centred in the middle. The further guide roller 28 supports this constant alignment.

FIGS. 12a, 12b and 13a, 13b show how the fish 10 drops through the transfer recess 16 following the force of gravity in the direction of the guiding channel floor 30. As can be seen from the drawing, the fish 10 moves with its flank 40 directed downwards towards the lateral guide surface 18 to finally achieve the desired ventral/dorsal alignment according to the illustration of FIGS. 14a and 14b.

Figure 12A:
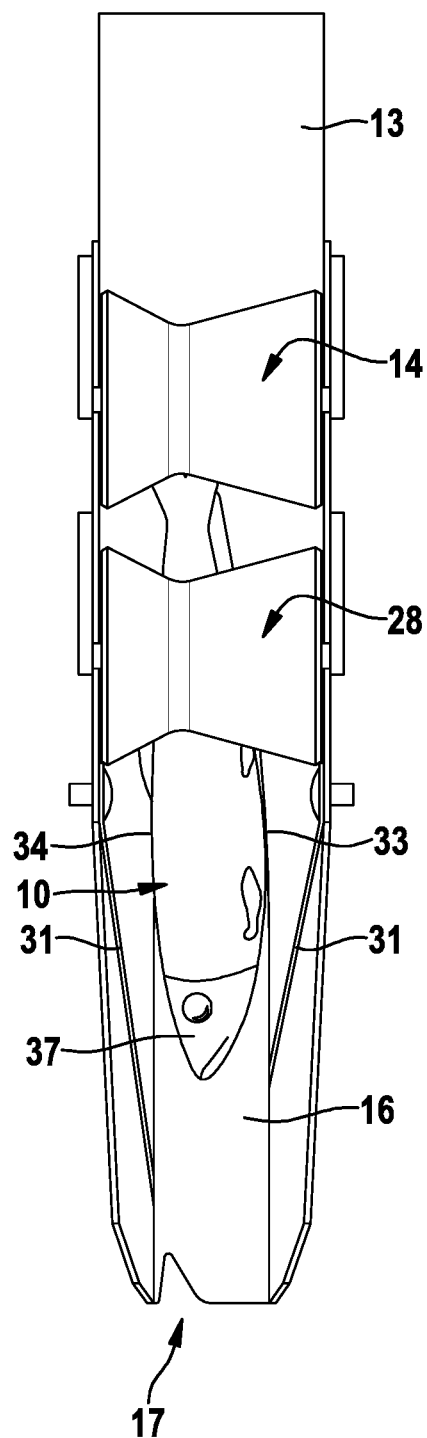
FIG. 12A shows a view from above as the fish further downstream in the apparatus than in FIG. 11A.
Figure 12B:
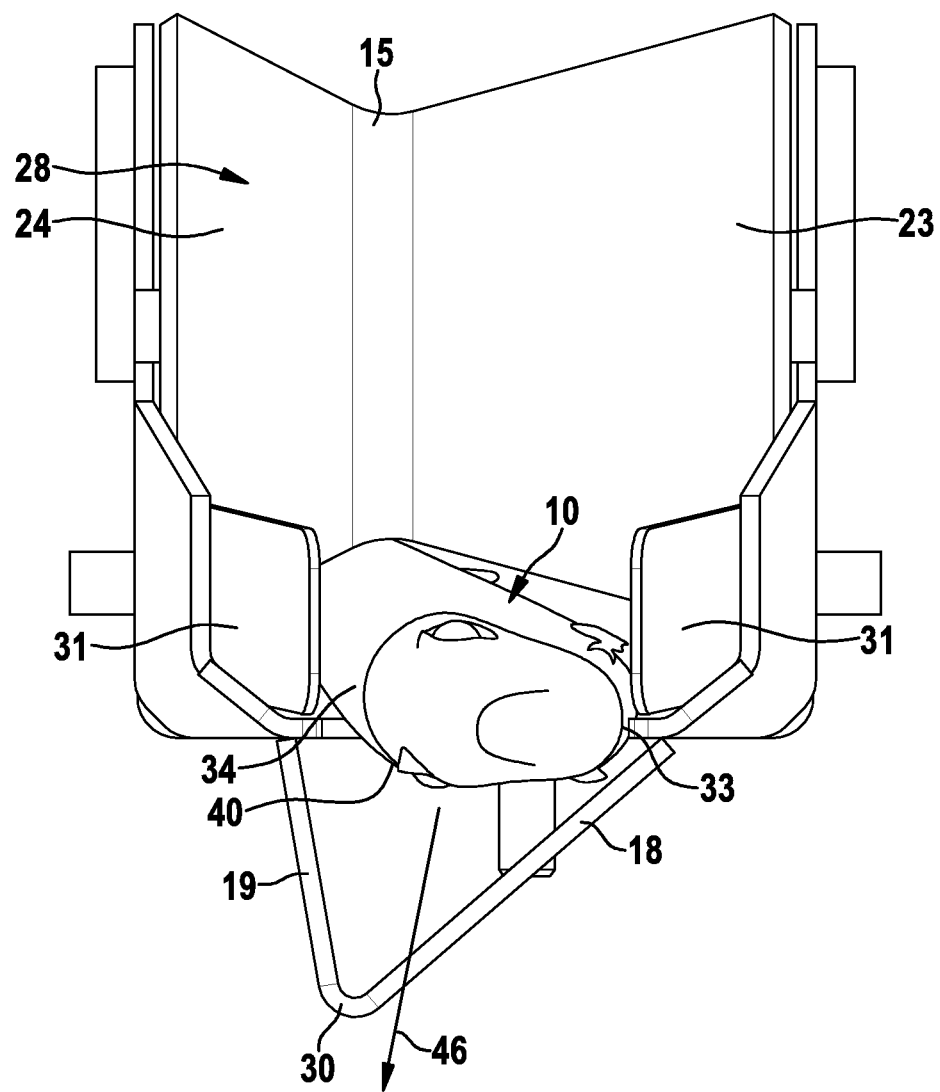
FIG. 12B shows a lateral view viewed counter to the conveying direction further downstream in the apparatus than in FIG. 11B.

In particular, the snapshot in FIG. 12b shows how the fish 10 is moved with its flank 40 first in the direction of the arrow 46. This movement is initially a substantially rotation-free movement. The fish 10 drops, following the force of gravity, in the direction of the arrow 46.

Figure 13A:
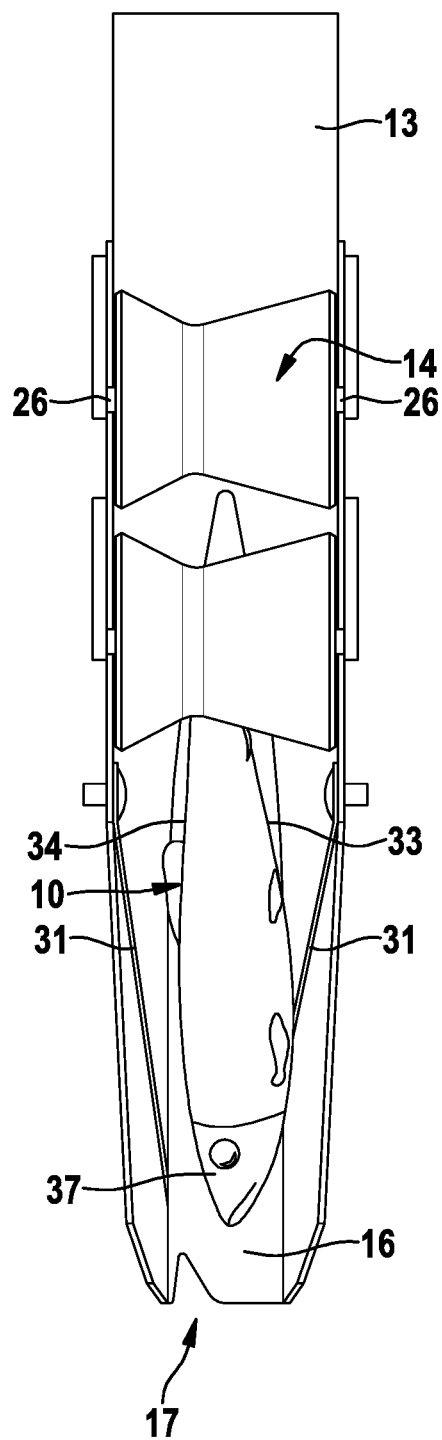
FIG. 13A shows a view from above as the fish further downstream in the apparatus than in FIG. 12A.
Figure 13B:
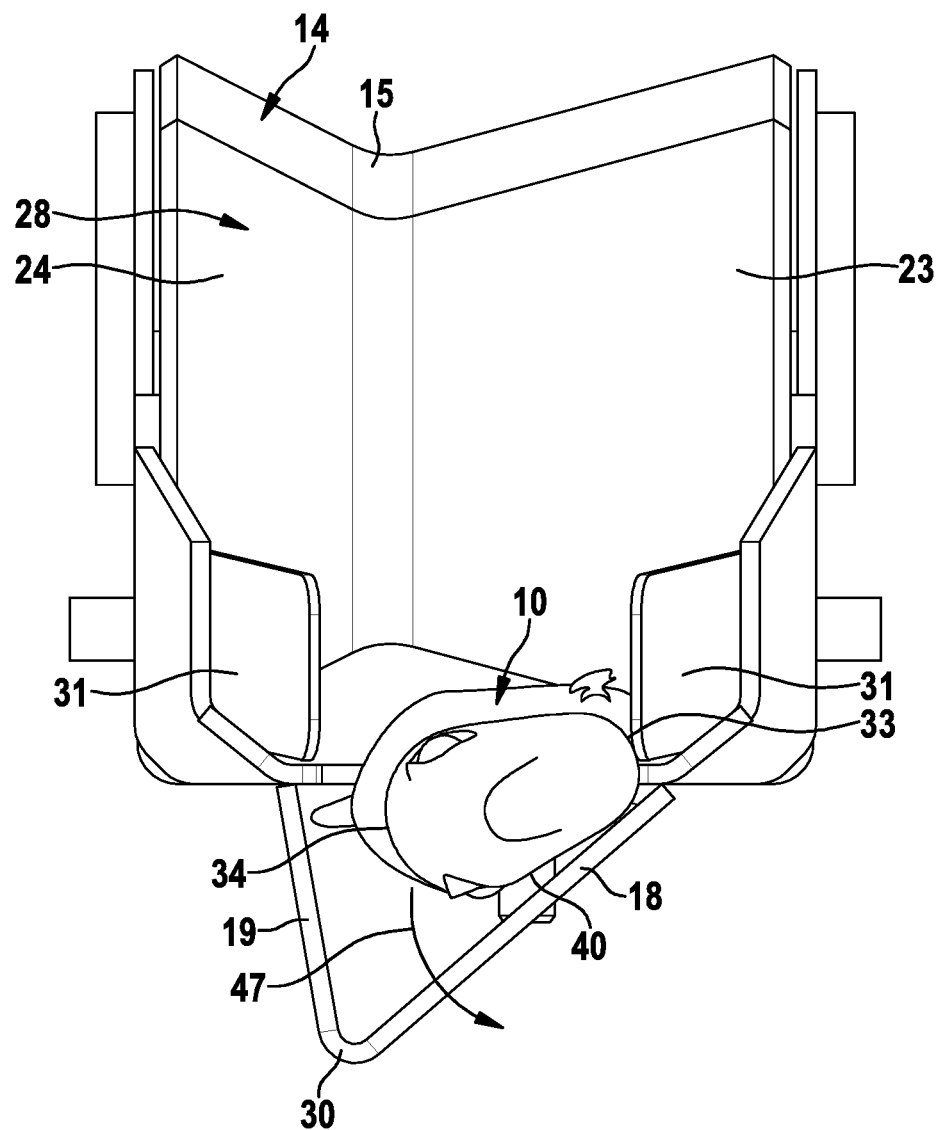
FIG. 13B shows a lateral view viewed counter to the conveying direction further downstream in the apparatus than in FIG. 12B.
Figure 14A:
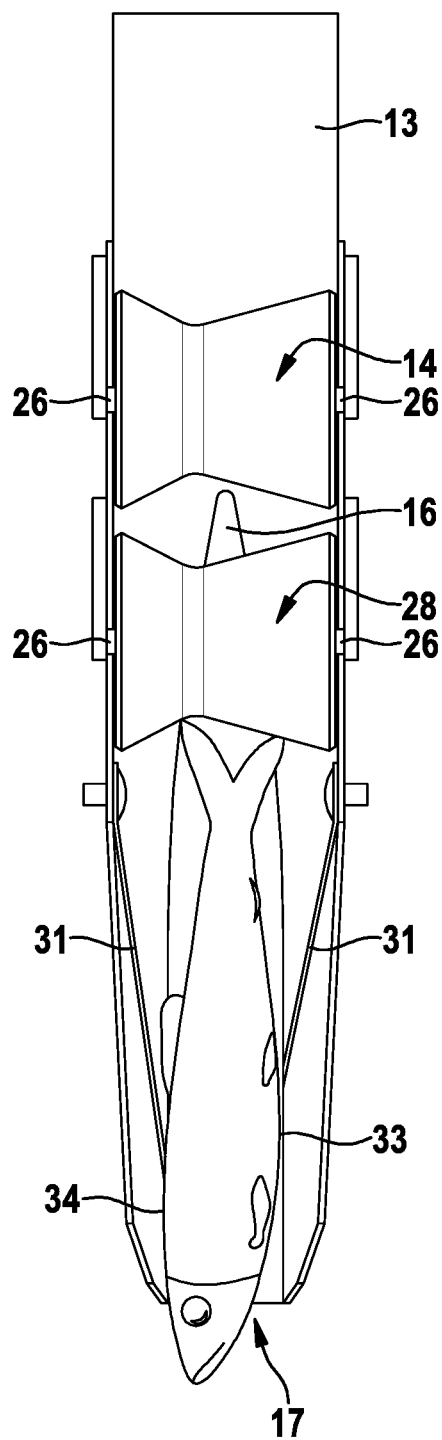
FIG. 14A shows a view from above as the fish further downstream in the apparatus than in FIG. 13A.
Figure 14B:
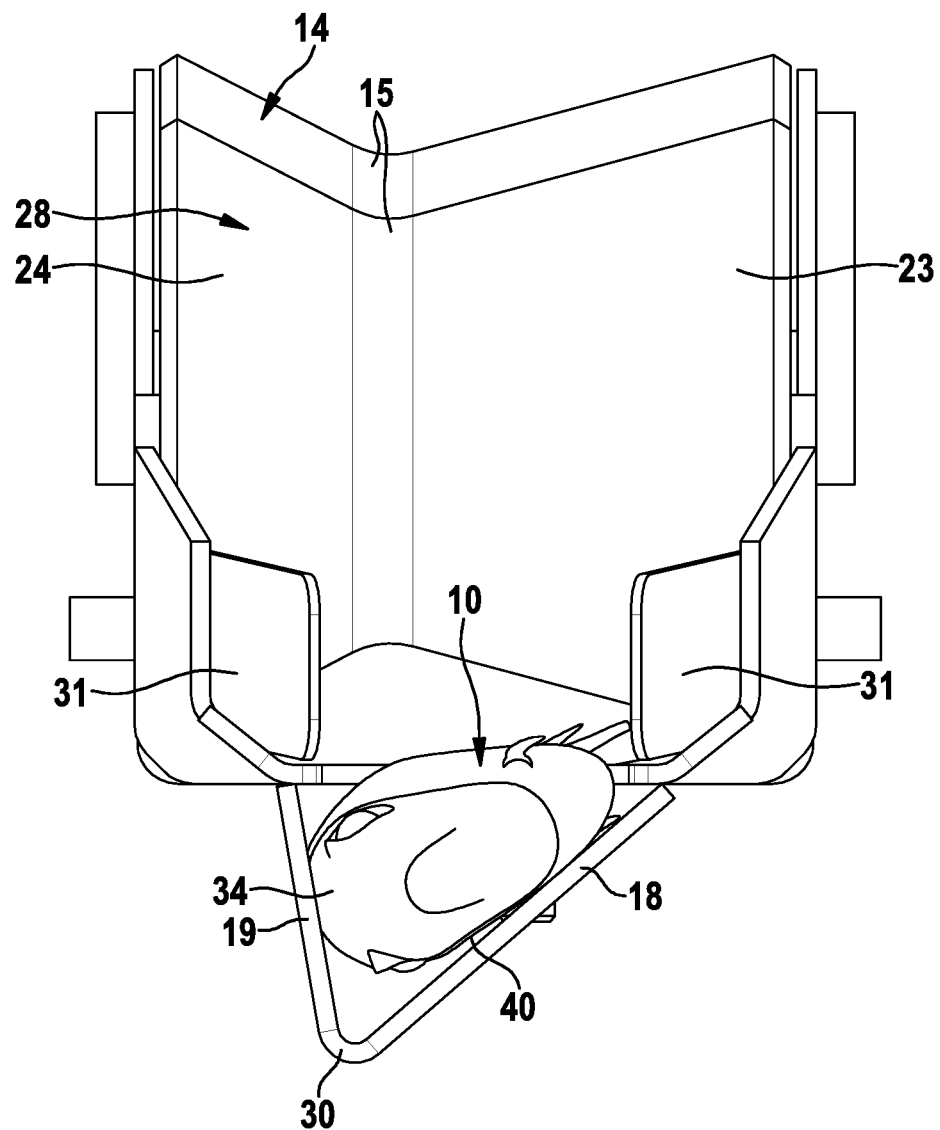
FIG. 14B shows a lateral view viewed counter to the conveying direction further downstream in the apparatus than in FIG. 13B.

Due to the lateral guide surfaces 18, 19 of different inclination and the associated support of the flank 40, which is not full-surface, the fish 10 additionally receives a certain rotational impulse about its longitudinal axis, such that the fish executes a pivoting movement about its longitudinal axis in the direction of the arrow 47, as shown in FIG. 13b, in order to finally arrive at the desired ventral/dorsal alignment showed in FIGS. 14a and 14b.

Figure 15:
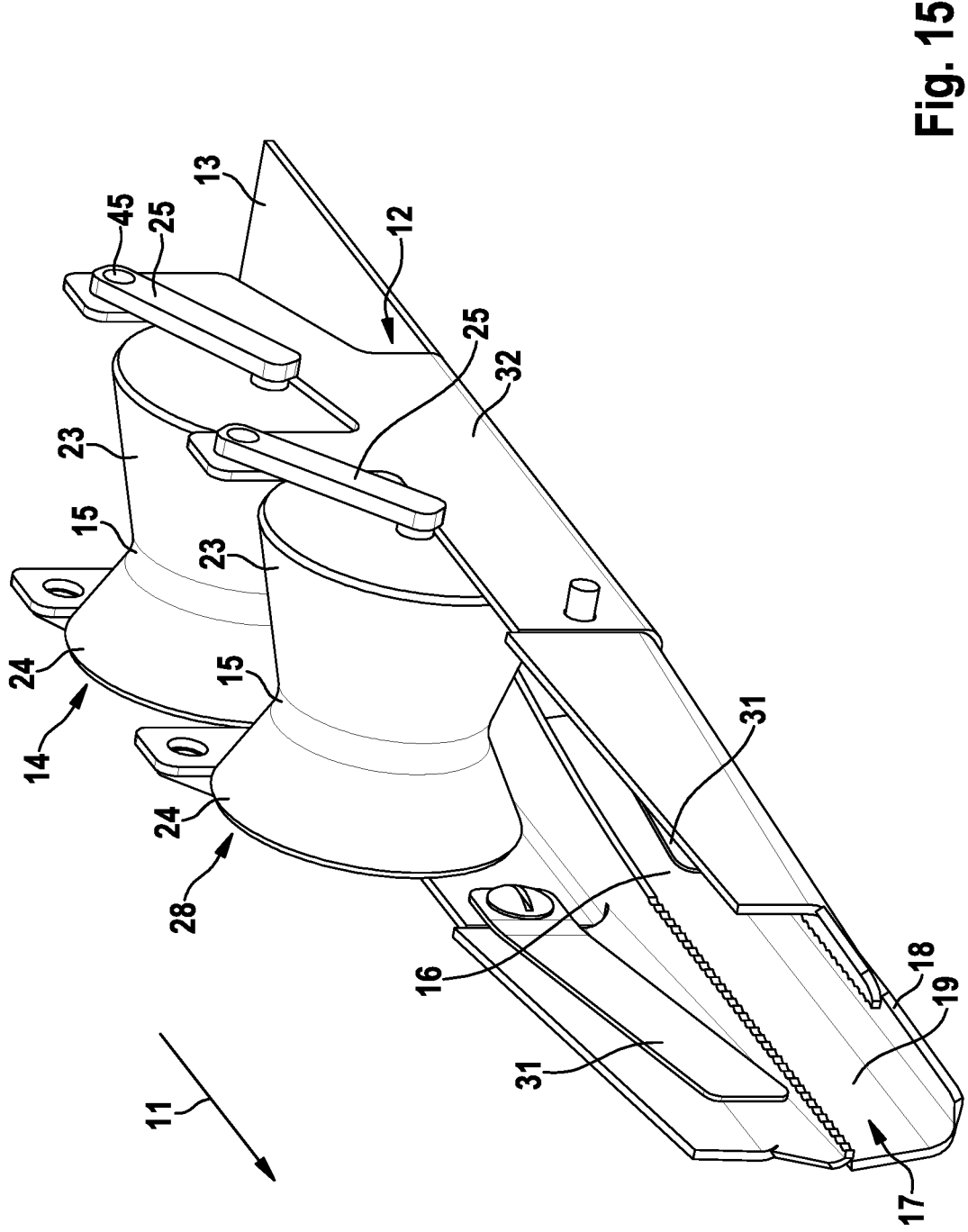
FIG. 15 shows a perspective view of the apparatus according to the invention viewed counter to the conveying direction.

FIG. 15 is a supplementary perspective view of the apparatus according to the invention viewed counter to the conveying direction 11. FIG. 16 shows an alternative embodiment to FIG. 15. Instead of the lever arms 25, the guide rollers 14, 28 are mounted in elongated holes 41. As shown in the drawing, the elongated holes 41 are preferably obliquely inclined in the conveying direction 11. In particular in conjunction with the said vibration conveying, this has a positive effect on the throughput rates, since the entire apparatus is set in to-and-fro motion in conveying direction 11 during the vibration conveying. Due to their mass inertia, the guide rollers 14, 28 move up and down via axles, not shown in the drawing, which are mounted in the elongated holes 41 and accelerate the fish 10 additionally during passage through the transfer recess 16.

Figure 17:
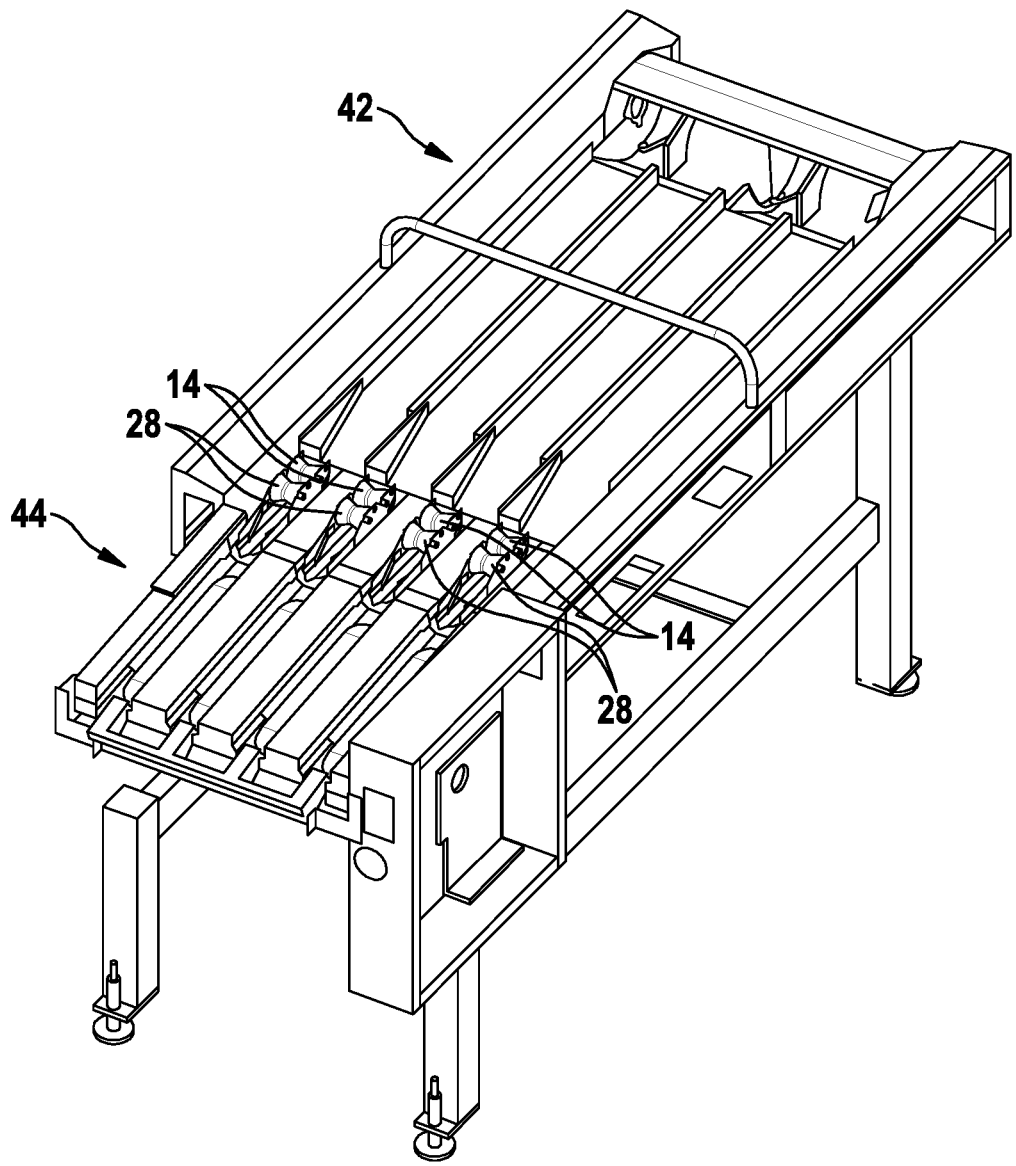
FIG. 17 shows a perspective view of four apparatuses according to the invention arranged in parallel with upstream feed-in unit.

Further preferably, a plurality of the apparatuses according to the invention are arranged in parallel. By way of example, FIG. 17 shows a perspective view of four apparatuses according to the invention, arranged in parallel with upstream feed-in unit 42. The feed-in unit pre-aligns the fish 10 and conveys them with the head 37 first to the respective feed-in channels 12.

Figure 18:
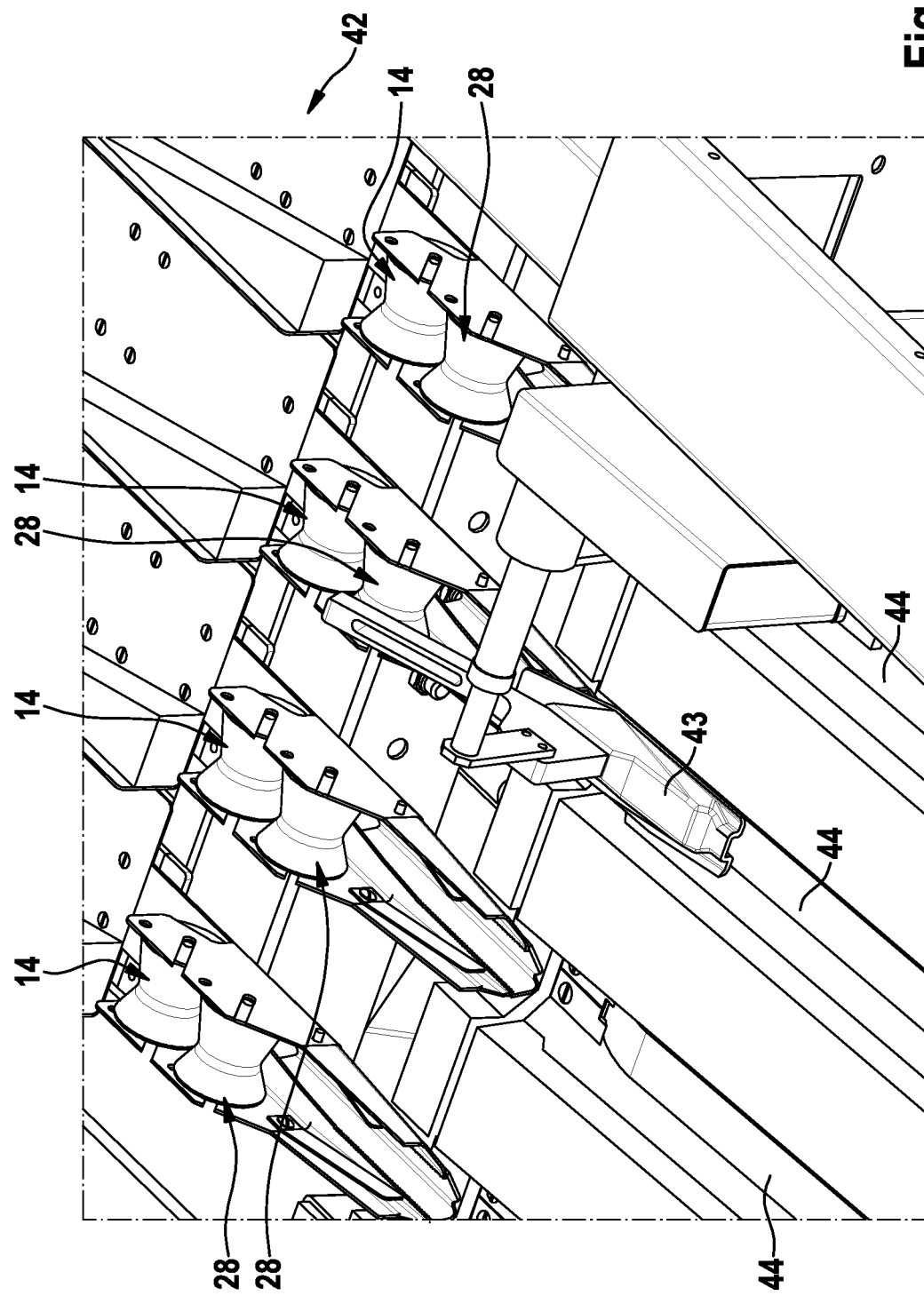
FIG. 18 shows an enlarged detailed view of a partial section of FIG. 17.

FIG. 18 shows an enlarged detailed view of a partial section of FIG. 17. FIG. 18 additionally illustrates clocking elements 43 which transfer the fish 10, which are leaving the guiding channel 17, to the other conveyors 44 in a controlled manner at predetermined cycle times.

The invention claimed is:

1. An apparatus for ventral/dorsal alignment of fish comprising:
   a first conveying device configured for conveying of fish head-first on their sides with a feed-in channel configured for guiding the fish in the conveying direction, said feed-in channel having a channel floor forming a first conveying plane,
   at least one guide roller arranged at a distance from the channel floor and configured for transversely positioning the fish in the feed-in channel, the at least one guide roller extending across the width of the feed-in channel and having at least one section with reduced cross-sectional diameter,
   wherein the channel floor in the center of the channel comprises a transfer recess, widening in the conveying direction, which is designed to transfer the fish by force of gravity to a guiding channel arranged below the first conveying plane by aligning in a predetermined ventral/dorsal position,
   wherein the guiding channel comprises lateral guide surfaces each arranged inclined with respect to the first conveying plane, and
   wherein a second conveying device forming a second conveying plane and configured to convey the fish on their sides, said second conveying device being arranged downstream of the guiding channel for taking over the fish at the end of said guiding channel.

2. The apparatus according to claim 1, wherein the section with reduced cross-sectional diameter of the at least one guide roller is arranged eccentrically with respect to the center of the feed-in channel.

3. The apparatus according to claim 1, wherein the cross-sectional diameter of the at least one guide roller, starting from the section with reduced cross-sectional diameter, is configured to increase outwardly toward outer sections of the at least one guide roller.

4. The apparatus according to claim 3, wherein the section with reduced cross-sectional diameter together with the outer sections forms a concave outer contour of the at least one guide roller.

5. The apparatus according to claim 3, wherein, in regions of the outer sections, the at least one guide roller is shaped at least substantially as truncated cones.

6. The apparatus according to claim 4, wherein the concave outer contour is configured step-free.

7. The apparatus according to claim 1, wherein the guide roller is arranged so as to be yieldingly mounted.

8. The apparatus according to claim 1, wherein at least one of the at least one guide rollers is arranged upstream of the transfer recess in the conveying direction.

9. The apparatus according to claim 1, wherein at least one of the at least one guide rollers is arranged in an entry region of the transfer recess, within which a width of the transfer recess is smaller than an end width of the transfer recess.

10. The apparatus according to claim 1, wherein inclinations of the lateral guide surfaces of the guiding channel are each different.

11. The apparatus according to claim 1, wherein the guiding channel is at least substantially triangular in cross-section.

12. The apparatus according to claim 1, wherein the lateral guide surfaces of the guiding channel are arranged inclined, in such a manner that they form a guiding channel floor which is aligned at least substantially flush with section of the at least one guide roller with reduced cross-sectional diameter.

13. The apparatus according to claim 1, wherein deflector elements are arranged laterally in each case in the feed-in channel, said deflector elements extending in each case, starting from the side walls of the feed-in channel, in the direction of the transfer recess.

14. The apparatus according to claim 1, wherein the channel floor of the feed-in channel is designed to be rough and the first conveying device is designed as a vibrating conveyor.

15. A method for ventral/dorsal alignment of fish comprising:
conveying of fish head-first on their sides via a first conveying device and guiding the fish in the conveying direction via a feed-in channel, which has a first channel floor forming a first conveying plane, wherein the channel floor in a center of the channel comprises a transfer recess, widening in the conveying direction,
transversely positioning the fish in the feed-in channel by at least one guide roller arranged at a distance from the channel floor, the at least one guide roller extending across a width of the feed-in channel and having at least one section with reduced cross-sectional diameter,
transferring the fish by force of gravity to a guiding channel arranged below the first conveying plane by aligning in a predetermined ventral/dorsal position, wherein the guiding channel comprises lateral guide surfaces each arranged inclined with respect to the first conveying plane, and
taking over the fish at an end of the guiding channel by a second conveying device forming a second conveying plane and conveying the fish on their sides via the second conveying device.

16. The method according to claim 15, wherein transversely positioning the fish by the at least one guide roller takes place in that the at least one guide roller has a section with reduced cross-sectional diameter, the at least one guide roller being arranged eccentrically with respect to the center of the feed-in channel.

17. The method according to claim 15, wherein transversely positioning the fish takes place by the at least one guide roller depending on the ventral/dorsal position of the fish, the cross-sectional diameter of the at least one guide roller, starting from the section with reduced cross-sectional diameter, increasing towards outer sections of the at least one guide roller.

18. The method according to claim 17, wherein transversely positioning by the at least one guide roller is brought about by a concave outer contour which the section with reduced cross-sectional diameter forms together with the outer sections.

19. The method according to claim 15, wherein the at least one guide roller yields against a restoring force when transversely positioning the fish.

20. The method according to claim 15, wherein the fish are first aligned transversely to the conveying direction in the feed-in channel by the at least one guide roller and subsequently pass through the transfer recess.

21. The method according to claim 15, wherein the fish are conveyed via the first conveying device by vibration.

* * * * *